(12) United States Patent
Daida

(10) Patent No.: US 11,068,364 B2
(45) Date of Patent: Jul. 20, 2021

(54) PREDICTABLE SYNCHRONOUS DATA REPLICATION

(71) Applicant: Intelliflash by DDN, Inc., Santa Clara, CA (US)

(72) Inventor: Kartheek Reddy Daida, San Jose, CA (US)

(73) Assignee: INTELLIFLASH BY DDN, INC., Santa Clara, CA (US)

(*) Notice: Subject to any disclaimer, the term of this patent is extended or adjusted under 35 U.S.C. 154(b) by 71 days.

(21) Appl. No.: 16/562,048

(22) Filed: Sep. 5, 2019

(65) Prior Publication Data

US 2021/0011822 A1 Jan. 14, 2021

(51) Int. Cl.

| G06F 12/00 | (2006.01) |
|---|---|
| G06F 11/20 | (2006.01) |
| G06F 11/14 | (2006.01) |
| G06F 11/30 | (2006.01) |
| G06F 3/06 | (2006.01) |

(52) U.S. Cl.
CPC .......... *G06F 11/2076* (2013.01); *G06F 3/064* (2013.01); *G06F 3/065* (2013.01); *G06F 3/067* (2013.01); *G06F 3/0619* (2013.01); *G06F 3/0659* (2013.01); *G06F 3/0683* (2013.01); *G06F 11/1448* (2013.01); *G06F 11/3034* (2013.01); *G06F 11/2082* (2013.01)

(58) Field of Classification Search
CPC .... G06F 11/2076; G06F 3/0619; G06F 3/064; G06F 3/065; G06F 3/0659; G06F 3/067; G06F 3/0683; G06F 11/1448; G06F 11/3034; G06F 11/2082
See application file for complete search history.

(56) References Cited

U.S. PATENT DOCUMENTS

| 6,996,691 | B2 | 2/2006 | Sicola et al. |
| 7,383,407 | B1 | 6/2008 | Kiselev |
| 7,603,391 | B1 | 10/2009 | Federwisch et al. |
| 7,720,801 | B2 | 5/2010 | Chen |
| 7,779,218 | B2* | 8/2010 | Fandel ................ G06F 11/2082 711/162 |
| 7,831,550 | B1 | 11/2010 | Pande et al. |
| 7,962,709 | B2* | 6/2011 | Agrawal ............. G06F 16/1734 711/162 |

(Continued)

OTHER PUBLICATIONS 19.8. ZFS Features and Terminology, Chapter 19. The Z File System (ZFS), See pp. 1-3.

*Primary Examiner* — John A Lane
(74) *Attorney, Agent, or Firm* — David R. Stevens; Stevens Law Group

(57) ABSTRACT

The method, apparatus, and system disclosed herein relate to a faster and more predictable way to achieve synchronous phase from non-synchronous phase for synchronous data replication between a source volume and a destination volume. Consistency data and replication data are sent in parallel during a pre-synchronous phase to reestablish a synchronous phase of operation. Sequence identifiers and consistency sequence identifiers are used to determine whether to write consistency data to the destination volume, or to leave consistency data unwritten for blocks already updated with replication data during the process of reestablishing synchronization.

18 Claims, 10 Drawing Sheets

(56) References Cited

U.S. PATENT DOCUMENTS

| | | | |
|---|---|---|---|
| 7,966,293 B1* | 6/2011 | Owara | G06F 11/1448 |
| | | | 707/654 |
| 8,078,816 B1 | 12/2011 | Thoppai et al. | |
| 10,019,194 B1 | 7/2018 | Baruch et al. | |
| 10,437,509 B1* | 10/2019 | Alexeev | G06F 3/065 |
| 10,545,994 B2* | 1/2020 | Chen | G06F 3/061 |
| 10,592,128 B1* | 3/2020 | Natanzon | G06F 11/1456 |
| 2004/0193952 A1* | 9/2004 | Narayanan | G06F 16/273 |
| | | | 714/13 |
| 2005/0138312 A1 | 6/2005 | Kubo et al. | |
| 2006/0236047 A1 | 10/2006 | Shitomi | |
| 2008/0114937 A1* | 5/2008 | Reid | G06F 11/3636 |
| | | | 711/117 |
| 2008/0250215 A1 | 10/2008 | Shitomi | |
| 2010/0191927 A1 | 7/2010 | Schnapp et al. | |
| 2011/0107025 A1 | 5/2011 | Urkude et al. | |
| 2011/0167234 A1 | 7/2011 | Nishibori et al. | |
| 2011/0191295 A1 | 8/2011 | Ozdemir et al. | |
| 2013/0138616 A1* | 5/2013 | Gupta | G06F 16/178 |
| | | | 707/690 |
| 2014/0040574 A1 | 2/2014 | McDowell et al. | |
| 2016/0004599 A1* | 1/2016 | Mam | G06F 3/0683 |
| | | | 711/103 |
| 2016/0292250 A1* | 10/2016 | Chen | G06F 16/273 |
| 2017/0185323 A1* | 6/2017 | Kaushik | G06F 11/1469 |
| 2019/0391740 A1* | 12/2019 | Cheng | G06F 3/067 |

* cited by examiner

PREDICTABLE SYNCHRONOUS DATA REPLICATION

CROSS-REFERENCE TO RELATED APPLICATIONS

This application claims priority to India Provisional Patent Application No. 201941028050, entitled "PREDICTABLE SYNCHRONOUS DATA REPLICATION", filed Jul. 12, 2019, in the Indian Patent Office, the entirety of which is incorporated by reference.

BACKGROUND

In synchronous data replication, achieving synchronous phase from a non-synchronous phase happens either during the start of a replication operation or after a failure or error condition during a replication operation. During a non-synchronous phase, storage devices seek to quickly achieve synchronous phase to protect against data loss during disasters To achieve synchronous phase through conventional methods, snapshots of the volume are sent to a destination node from a beginning point to the latest snapshot. The volume continues to change due to incoming write commands at the source node. The interval of transferring snapshots is progressively reduced to incrementally reduce the differential for a one-shot transfer. Once the differential is small enough, the incoming IO (e.g., storage commands) is paused on the synchronous replication source node, and a last snapshot of differential data is transferred in one transaction. Once the last differential is transferred to the destination, synchronous data replication of IO on the synchronous replication source node to the destination node is set up and live IO (incoming storage commands) on the synchronous replication source node is resumed. Both the source volume and the destination volume are in the synchronous phase.

However, at higher data rates between a host and the source node, this conventional method becomes impractical. In some cases, the differentials between snapshot may not reduce to an acceptable level because of the high rates of incoming data (write commands) to the source node. It may take an unacceptably long time to achieve synchronization. In certain circumstances, the bandwidth available between the source node and destination node may be limited such that the amount of data to be transferred between snapshots is too high to complete within the desired time frame. A faster and more predictable way to reestablish synchronization is needed.

BRIEF SUMMARY

The method, apparatus, and system disclosed herein relate to a faster and more predictable way to achieve a synchronous phase from a non-synchronous phase of logical synchronous replication. Further, the method, apparatus, and system disclosed herein relate to a faster and more predictable way to achieve a synchronous phase from a non-synchronous phase in which the destination volume and source volume have not yet established a synchronous data replication relationship.

This disclosure relates to an apparatus comprising a replicator configured to replicate a data block of a write command directed to a source volume to a destination volume by sending replication write commands. The apparatus disclosed herein further comprises a synchronizer configured to synchronize inconsistent data blocks of the source volume with corresponding data blocks of the destination volume by sending consistency write commands. The disclosed apparatus comprises a source storage manager configured to receive the write command and configured to operate the replicator and the synchronizer in parallel and to send an acknowledgement for the write command to a host.

This disclosure further relates to a system that comprises a source node, including a source volume and a source storage manager. The source storage manager is configured to establish a synchronous phase of synchronous data replication between the source volume and a destination volume while servicing write commands from a host directed to the source volume. The system further comprises a destination node, including the destination volume and a destination storage manager. The destination storage manager is configured to coordinate with the source storage manager to reestablish the synchronous phase of synchronous data replication with the source node in response to the source volume and destination volume becoming unsynchronized. The disclosed system finally comprises a communication channel between the source node and the destination node. The communication channel comprises a network path between the source node and the destination node.

Finally, this disclosure relates to a method comprising determining that a source volume and a destination volume are out of synchronization and creating a first snapshot of the source volume. The method next continues to service write commands directed to the source volume from a host concurrent with creating the first snapshot. The method further comprises determining that the destination volume is available to resume synchronous data replication, quiescing the write commands from the host directed to the source volume, and then creating a second snapshot of the source volume. The method then resumes the synchronous data replication between the source volume and the destination volume, in response to successful creation of the second snapshot. The method further comprises determining a set of inconsistent data blocks between the first snapshot and the second snapshot. The set of inconsistent data blocks is then sent from a source node to a destination node while simultaneously performing the synchronous data replication between the source volume and the destination volume. Finally, the method comprises applying a data block of the set of inconsistent data blocks to the destination volume, in response to the data block comprising a most recent version of the data block relative a corresponding data block within the destination volume.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
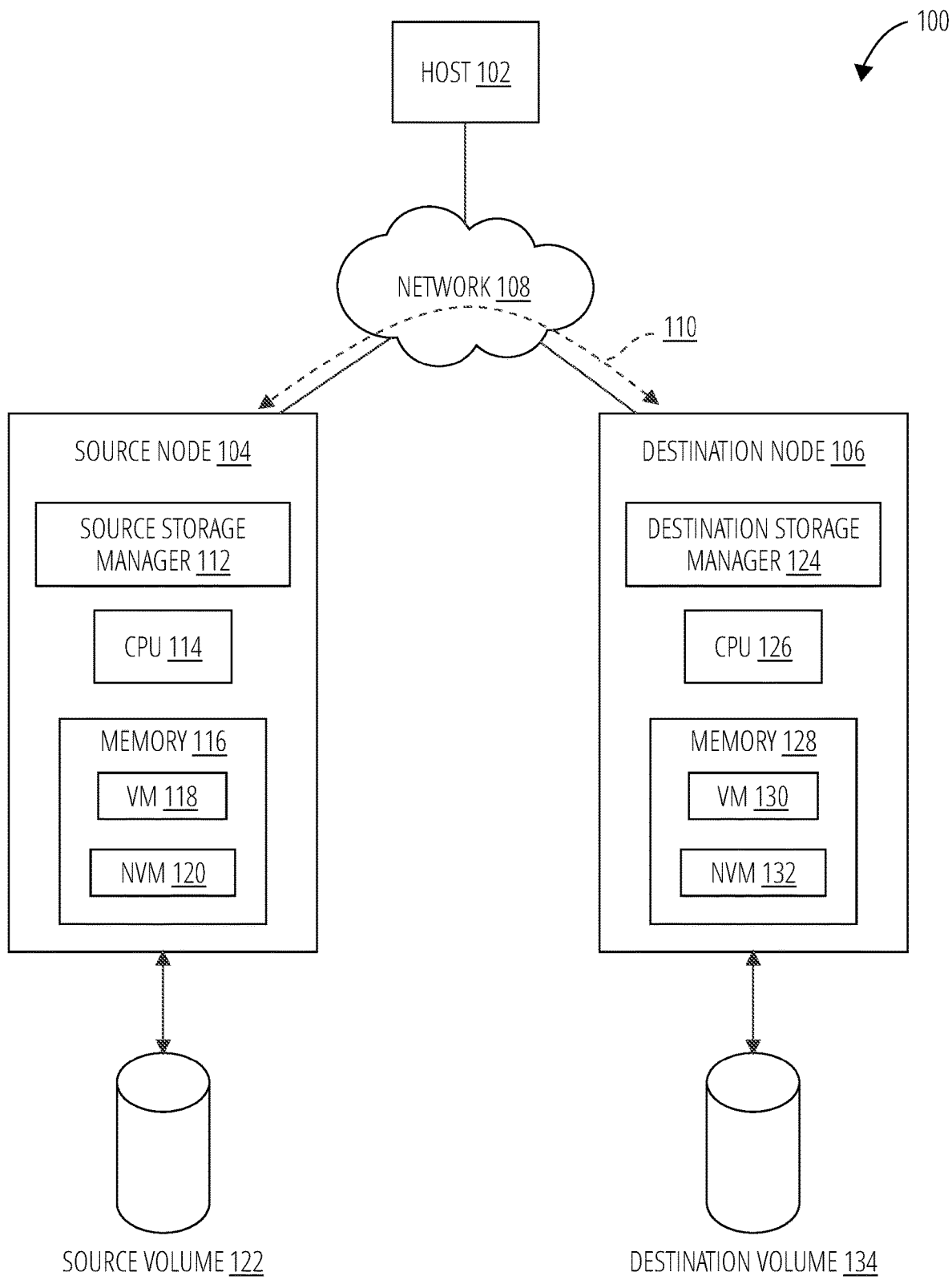
FIG. 1 illustrates a storage system 100 in accordance with one embodiment.

To achieve a synchronous phase from a non-synchronous phase in a fast and predictable manner, the disclosed method, apparatus, and system may transfer consistency data (also referred to herein as backup IO sent using consistency write commands) and transfer replication data (also referred to herein as live IO which is sent using replication write commands) in parallel by using a constraint that consistency data may not overwrite the replication data at any time during the process. Thus, once all of the consistency data is transferred and stored on the destination volume, the system may be in synchronous phase implicitly. This solution is predictable because regardless of the configuration between the source node and the destination node the source node can increase the transfer rate of consistency data relative to the replication data such that the synchronous phase is accomplished within a desired time frame.

"Live IO" refers to Input/Output (IO) commands that include a write command or a read command. Certain live IO commands may cause data to be read from a storage device and other live IO commands may cause data to be written to a storage device. Examples of live IO commands include, but are not limited to, write commands, read commands, free data block commands, UNMAP commands, check point commands, and the like.

Embodiments of the solution in which the consistency write commands include write commands and free data block commands, etc. may determine if the data block is overwritten by replication data or not before proceeding to write consistency data. This may be accomplished by tracking the set of inconsistent data blocks before starting the pre-synchronous phase. Before the resynchronization mechanism may begin, a snapshot may be created on the destination node of the destination volume. This snapshot may serve as a basis from which to track changed data blocks going forward.

"Write command" refers to a storage command configured to direct the recipient to write, or store, one or more data blocks on a persistent storage media, such as a hard disk drive, non-volatile memory media, or the like. A write command may include any storage command that may result in data being written to physical storage media of a storage device. The write command may include enough data to fill one or more data blocks, or the write command may include enough data to fill a portion of one or more data blocks. In one embodiment, a write command includes a starting LBA and a count indicating the number of LBA of data to write to on the storage media. "Storage media" refers to any physical media organized and configured to store one or more bits of data. In one embodiment, storage media refers to physical storage cells and/or memory cells used in volatile memory media. In another embodiment, storage media refers to physical storage cells and/or memory cells used in non-volatile memory media.

"Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media, but is an abstract reference to the data. "Logical block address" refers to a value used in a block storage device to associate each of n logical blocks available for user data storage across the storage media with an address. In certain block storage devices, the logical block addresses (LBAs) may range from 0 to n per volume or partition. In block storage devices, each LBA maps directly to a particular data block, and each data block maps to a particular set of physical sectors on the physical storage media. "LBA" refers to an abbreviation for a logical block address.

"Snapshot" refers to a method, process, and/or mechanism for capturing a representation of a state of a storage volume at a particular point in time. A snapshot is configured such that the time required to create the snapshot does not change with a change in the size of the volume that is the subject of the snapshot.

In certain embodiments, creation of a snapshot includes defining a consistency sequence identifier associated with the snapshot. In certain embodiments, the creation of the snapshot is almost instantaneous. In one embodiment, both the source node and the destination node operate a ZFS file system and use transaction group numbers as sequence identifiers for sets of data blocks and for consistency sequence identifiers associated with snapshots. In this embodiment, creation of a snapshot on both the source node and the destination node for a source volume and corresponding destination volume creates a consistency point. Further, in this embodiment, the almost instantaneous snapshot creation is enabled, at least in part, by the ZFS file system comprising a volume manager and managing volume (s) (e.g., source volume on the source node and destination volume on the destination node) using a re-direct on write (ROW) implementation of the copy-on-write (COW) protocol.

During a pre-synchronous phase, if a data block is written to storage media on the destination node after the snapshot is written, the disclosed system may either ignore the data block or proceed with storing the replication data.

Tracking of data blocks from the base snapshot may be accomplished using a sequence identifier and/or consistency sequence identifier stored with the data block. The sequence identifier and consistency sequence identifier may be, for example, a transaction group number (txg). Any txg greater than the txg of a created snapshot (referred to herein as a consistency point) may imply that the data block has been overwritten by replication data. A txg for the data block that is less than or equal to the txg of the consistency point may imply the data block has not been overwritten by replication data.

A predictable and faster mechanism to achieve synchronous phase may be achieved through this disclosure. The amount time taken to achieve synchronous phase may be proportional to the time taken to transfer consistency data, rather than the time it takes for a delta (or differential)

between snapshots and replication data to reduce to a minimum level before cutting over to be in synchronous phase. In certain conventional systems, the rate at which new write commands are received for the source volume may be so high that the delta (gap) between snapshots in the conventional approach may be impossible to close; the cut-over may be limited by the data transfer rate between the source node and the destination node.

FIG. 1 illustrates a storage system 100 according to one embodiment, configured to support synchronous data replication. "Synchronous data replication" refers to a storage operation in which data of a source volume and any changes to data blocks of the source volume from a host are replicated on (e.g., copied to) a destination volume, while both the source node and the destination node continue to service storage requests from one or more hosts. In certain embodiments, the synchronous data replication operation is configured such that data blocks of the source volume are guaranteed to match (be the same as) corresponding data blocks on the destination volume, or else an error condition is reported. If the data blocks of the source volume do not match (are not the same as) data blocks of the destination volume, then the source volume and destination volume are out of synchronization. The storage system is aware of, and able to track or determine, the difference between data blocks of the source node and corresponding data block of the destination node such that there is no corruption of data blocks and the appropriate data blocks can be re-synchronized.

The storage system 100 comprises a host 102, a source node 104, a destination node 106, a network 108, and a communication channel 110. "Host" refers to any computing device, computer device, or computer system configured to send and receive storage commands. Examples of a host include, but are not limited to, a computer, a laptop, a mobile device, an enterprise server, a desktop, a tablet, a main frame, and the like.

"Source node" refers to any hardware, system, subsystem, storage array, storage appliance, software, firmware, circuit, component, module, logic, device, or apparatus configured, programmed, designed, arranged, and/or engineered to operatively engage with, and/or manage a source volume.

In one embodiment, a source node comprises a storage device addressable by a host by which means data may be written to the source volume and replicated, copied, moved, or migrated to a destination node depending on the storage operation implemented by both the source node and the destination node. In one embodiment, the source node comprises a storage device addressable by a host by which means data may be written from the source node to the destination node as part of synchronous data replication.

"Destination node" refers to any hardware, system, subsystem, storage array, storage appliance, software, firmware, circuit, component, module, logic, device, or apparatus configured, programmed, designed, arranged, and/or engineered to operatively engage with, and/or manage a destination volume.

In one embodiment, a destination node comprises a storage device addressable by a host by which means data may be written to the destination volume and replicated, copied, moved, or migrated from a source node depending on the storage operation implemented by both the source node and the destination node. In one embodiment, the destination node comprises a storage device addressable by a source node by which means data may be written to the destination node as part of synchronous data replication.

"Communication channel" refers to a medium of signal transmission between a source node and a destination node that permits commands and acknowledgements to be sent from each node to the other. This may comprise a network path, wired connection, or any other electrically functional signaling medium.

The communication channel 110 includes a network path used by the source node and destination node to communicate. "Network path" refers to a path for sending communication signals (e.g., analog or digital) between multiple entities. A network path may act as a medium for wired or wireless signaling protocols, and may connect entities on a peer-to-peer basis, on a parent-child basis, or some combination of these.

The source node 104 includes a source storage manager 112, a CPU 114, and a memory 116 made up of volatile memory 118, non-volatile memory 120, and a source volume 122. "Memory" refers to any hardware, circuit, component, module, logic, device, or apparatus configured, programmed, designed, arranged, or engineered to retain data. Certain types of memory requires availability of a constant power source to store and retain the data. Other types of memory retains and/or stores the data when a power source is unavailable.

"Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media. "Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as "memory media," in various embodiments, the volatile memory media may more generally be referred to as volatile memory. In certain embodiments, data stored in volatile memory media is addressable at a byte level which means that the data in the volatile memory media is organized into bytes (8 bits) of data that each have a unique address, such as a logical address.

"Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like. The alterable physical characteristic is such that, once set, does not change so much when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

"Volume" refers to another term for a logical partition. "Source volume" refers to a logical partition or volume that includes data blocks that are used in storage commands from a host. A source volume is a volume controlled by a storage manager and serves as the source of data for a synchronous data replication operation. In certain embodiments, a source volume is also referred to as a primary volume. Data blocks of the source volume are replicated to a destination volume in a synchronous data replication operation.

The destination node 106 includes a destination storage manager 124, a CPU 126, and a memory 128 made up of a volatile memory 130, a non-volatile memory 132, and a destination volume 134. The memory 128, volatile memory 130, and non-volatile memory 132, are similar in functionality, type, feature set and operation to correspondingly named elements of the source node 104 (e.g., memory 116, volatile memory 118, and non-volatile memory 120)

"Destination volume" refers to a logical partition or volume that includes data blocks that are used in storage commands from a host. A destination volume is a volume controlled by a storage manager and serves as the destination for data in a synchronous data replication operation. In certain embodiments, a destination volume is also referred to as a secondary volume. Data blocks of the destination volume of a synchronous data replication operation are copies of corresponding data blocks on a source volume.

"Data block" refers to a smallest physical amount of storage space on physical storage media that is accessible and/or addressable using a storage command. The physical storage media may be volatile memory, non-volatile memory, persistent storage, non-volatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or the like operating systems, the data blocks are referred to simply as blocks. A data block or cluster represents a smallest physical amount of storage space on the storage media that is managed by a storage controller. A block storage device may associate n data blocks available for user data storage across the physical storage media with a logical block address, numbered from 0 to n. In certain block storage devices, the logical block addresses may range from 0 to n per volume or logical partition. In conventional block storage devices, a logical block address maps directly to one and only one data block.

"Logical partition" refers to any logical division of physical storage media, alone or in aggregate with other storage media. Examples of a logical partition include, but are not limited to, a LUN, a namespace, volume, a share, and the like. In the industry, a logical partition is referred to as a logical unit number (LUN) (which is referenced using a LUN as the partition identifier) or as a namespace (which is referenced using a namespace identifier (NSID) as the partition identifier). Both logical unit number and namespace can be used interchangeably herein. Both LUN and namespace identifier can be used interchangeably herein. A namespace may also be interchangeably referred to as a logical partition or logical unit number (LUN). In one embodiment, a namespace is a range of contiguous and monotonically increasing logical block addresses. Each namespace of a plurality of namespaces comprises a set of logical block addresses (LBA).

"Partition identifier" refers to any identifier for a logical or physical partition.

"Share" refers to another term for a logical partition.

"LUN" refers to an abbreviation for a logical unit number.

"Source storage manager" refers to any hardware, software, firmware, circuit, component, module, logic, device, or apparatus configured, programmed, designed, arranged, or engineered to service one or more storage commands, including write commands. In one embodiment, the source storage manager awaits an acknowledgement from a manager/controller of one or more other components, devices, circuits, or modules, confirming that each storage command has been successfully executed. In one embodiment, the source storage manager is configured to retry a storage command if an earlier attempted execution of the storage command is unsuccessful. In one embodiment, all of the features, functions, and capabilities of the source storage manager are implemented at a source location. In another embodiment, certain features, functions, and/or capabilities of the source storage manager are implemented at a source location and certain other or complementary features, functions, and/or capabilities of the source storage manager are implemented by one or more corresponding storage managers, such as a destination storage manager, at one or more destination locations.

As used herein, servicing of a storage command, including a write command, means receiving the storage command from a host and performing all necessary actions to fulfill the storage command, including, but not limited to, validating or authenticating that the host has permission to execute the storage command, retrieving data required for validation or authentication, retrieving data to fulfill the storage command, generating data to fulfill the storage command, writing data to fulfill the storage command, and returning data, an acknowledgement, or other result to the host that issued the storage command.

Depending on the embodiment and implementation, servicing of a storage command may include performing actions locally on a node, device, or controller, that received the storage command and/or proxying the storage command to another node, device, or controller to have one or more actions performed as part of the servicing. Examples of storage commands that may be serviced by one or more components, modules, or actors in this disclosure include servicing of synchronous data replication commands, data migration commands, SCSI commands, SCSI PGR commands, and the like.

In one embodiment, the source storage manager comprises logic or software executed by a CPU, controller, SoC, state machine, FPGA, or other controller.

"Destination storage manager" refers to any hardware, software, firmware, circuit, component, module, logic, device, or apparatus configured, programmed, designed, arranged, or engineered to service one or more storage commands, including write commands. In one embodiment, the destination storage manager awaits an acknowledgement from a manager/controller of one or more other components, devices, circuits, or modules, confirming that each storage command has been successfully executed. In one embodiment, the destination storage manager is configured to retry a storage command if an earlier attempted execution of the storage command is unsuccessful. In one embodiment, all of the features, functions, and capabilities of the destination storage manager are implemented at a source location. In another embodiment, certain features, functions, and/or capabilities of the destination storage manager are implemented at a source location and certain other or complementary features, functions, and/or capabilities of the destination storage manager are implemented by one or more corresponding storage managers, such as a source storage manager, at one or more destination locations.

As used herein, servicing of a storage command, including a write command, means receiving the storage command from a host and performing all necessary actions to fulfill the storage command, including, but not limited to, validating or authenticating that the host has permission to execute the storage command, retrieving data required for validation or authentication, retrieving data to fulfill the storage command, generating data to fulfill the storage command, writing data to fulfill the storage command, and returning data, an acknowledgement, or other result to the host that issued the storage command.

Depending on the embodiment and implementation, servicing a storage command may include performing actions locally on a node, device, or controller, that received the storage command and/or proxying the storage command to another node, device, or controller to have one or more actions performed as part of the servicing. Examples of storage commands that may be serviced by one or more components, modules, or actors in this disclosure include servicing of synchronous data replication commands, data migration commands, SCSI commands, SCSI PGR commands, and the like.

In one embodiment, the destination storage manager comprises logic or software executed by a CPU, controller, SoC, state machine, FPGA, or other controller.

"Acknowledgement" refers to a signal acknowledging receipt of a storage command from a host or other storage node and successful completion of the storage command.

It should be noted that in certain embodiments, the memory, such as memory 116 and memory 128, may include volatile memory and/or non-volatile memory, and that the volume may be stored in non-volatile memory or on a storage device such as a hard disk. Those of skill in the art will recognize that the non-volatile memory may serve as a cache or log for data blocks prior to storing the data blocks on a long-term storage device, such as a hard disk drive. In the embodiments described herein, the memory may be used as temporary storage media, and the data in the memory may eventually be moved to a long-term storage device, such as a hard disk drive, data pool, or the like.

The storage system 100 may provide synchronous data replication and constant, uninterrupted access to source volume 122 by way of the source storage manager 112 on the source node 104 coordinating with the destination storage manager 124 on the destination node 106.

Figure 2:
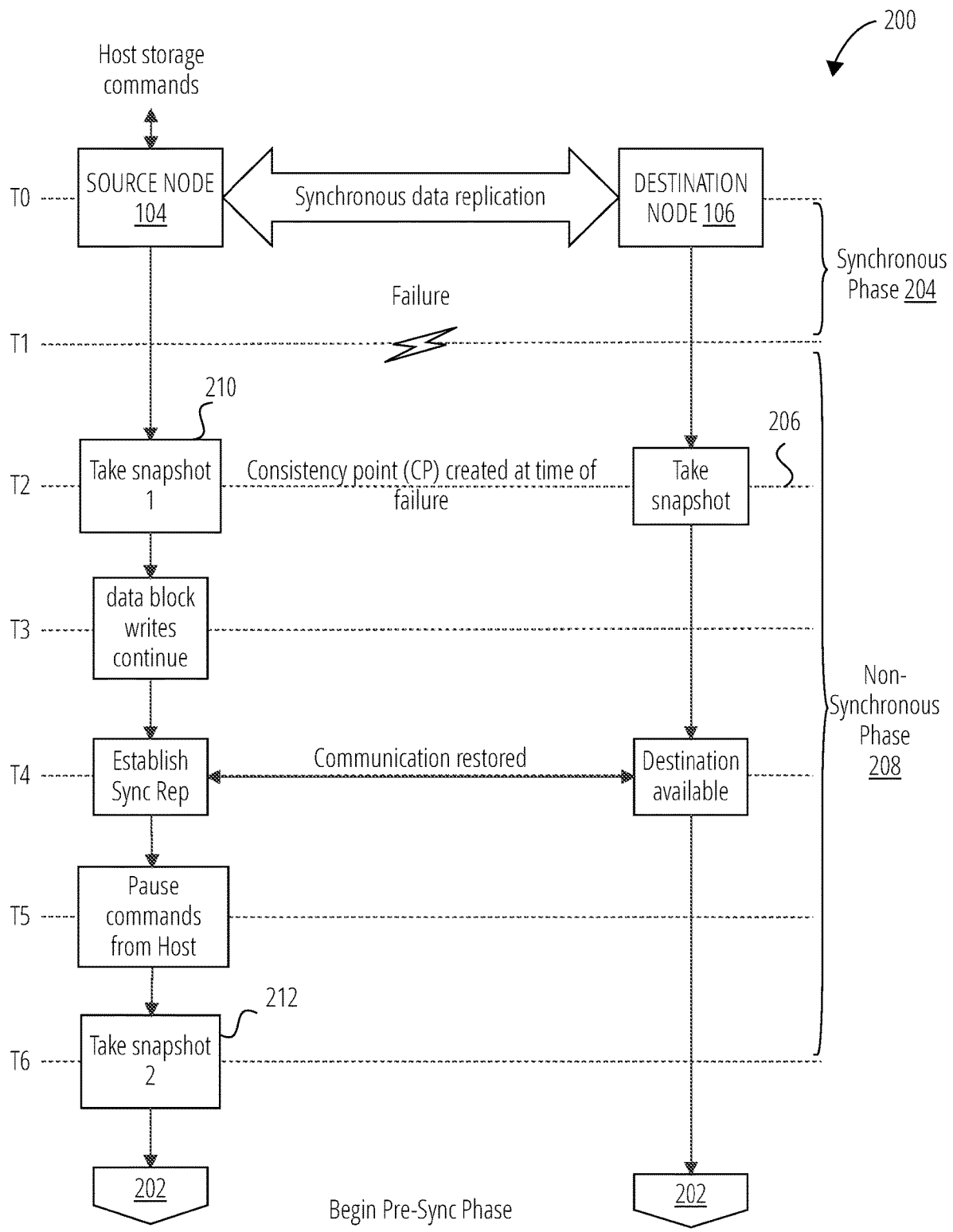
FIG. 2 illustrates a first portion of process flow for recovering to a synchronous phase of synchronous data replication 200 in accordance with one embodiment.

FIG. 2 illustrates a process flow for recovering to a synchronous phase of synchronous data replication 200 in accordance with one embodiment. At time T0, host 102 may communicate with the source node 104 by way of storage commands to access and update a source volume 122. The source node 104 may send replication data to a destination node 106 for storage in a destination volume 134. In one embodiment, the source node 104 may wait to store data blocks on the source volume 122 until the replication data has been acknowledged by the destination node 106 as being permanently stored on the destination volume 134. Then, the source node 104 may store the data block on the source volume 122. This phase may be referred to as a synchronous phase 204 of operation. "Synchronous phase" refers to a phase, stage, or state of operation during synchronous data replication in which all data blocks on a source volume are consistent with (e.g., match, are in synchronization with) the data blocks on a destination volume.

"Replication data" refers to data that represents data values of a data block being copied or replicated between a source volume and a destination volume. Replication data is included in data blocks of a replication write command.

In certain embodiments, a synchronous data replication is configured such that data for a data block is not stored on a source volume unless and until the data is acknowledged as having been stored on a destination volume. If a failure occurs during any stage of storing the data block on both the source volume and the destination volume, the operation is reversed so that the state of data on the source volume remains consistent with the data on the destination volume.

At some point, a failure may occur, disrupting the synchronous phase 204. The failure may be any failure that prevents the source node 104 and destination node 106 from successfully writing data for the same data block and confirming that both volumes (e.g., source volume 122 and destination volume 134) stored the same data. In one embodiment, the failure may be a communication failure between the source node 104 and the destination node 106. This may occur at time T1, and the source node 104 and destination node 106 (and their corresponding volumes) may enter a non-synchronous phase 208 of operation. "Non-synchronous phase" refers to a phase, stage, or state of operation during synchronous data replication in which one or more data blocks of a first volume are inconsistent with (e.g., do not match) the data blocks of one or more other volume(s). In certain embodiments, the first volume is a source volume and the one or more other volume(s) are destination volumes.

The source node 104 and/or destination node 106 may determine that the synchronous data replication has transitioned to a non-synchronous phase 208. Consequently, the source node 104 and destination node 106 may create a consistency point 206 at time T2. "Consistency point" refers to a point in time that is determinable, preserved, and identified, and that can be referenced by either or both of a source node and a destination node, as a point in time of a sequence of events when it is known that all data in data blocks of a source volume are consistent with, or match, or are exactly the same as, data blocks of a destination volume.

In one embodiment, a consistency point is defined and measured by the state of data blocks in both the source volume and the destination volume together, and not in relation to either the source volume or the destination volume alone.

In one embodiment, a consistency point is represented by a consistency sequence identifier, such as a transaction group number assigned to and associated with a snapshot taken of a volume.

Said another way, at a consistency point, a state of each data block on a destination volume is known to match the state of each corresponding data block on a source volume. Corresponding data blocks are data blocks that have the same LBAs. The matching state of the data blocks is referred to herein as consistency between data blocks of the source volume and data blocks of the destination volume.

In one example, suppose a source node and destination node are performing synchronous data replication, and a failure occurs that disrupts the synchronous data replication. Because of how synchronous data replication operates, the source node determines that the source volume and destination volume are consistent prior to the failure. Consequently, when the failure is resolved, the source node and destination node may create a consistency point for use as a point of reference for a re-synchronization operation. A re-synchronization operation may be needed because the source node may continue to receive write commands for the source volume while the failure remains unresolved. These write commands may cause the source volume and destination volume to become inconsistent (e.g., data in both volumes does not match). The data block of the consistency write command may comprise changes to data of the data block since the consistency point.

"Sequence identifier" refers to a monotonically increasing value, such as a number, that represents a sequence of events and can be relied upon to determine an order of operations for the sequence of events. In one embodiment, a sequence identifier is a number with a sufficient number of digits that when two separate sequence identifiers are compared there is no confusion as to the order of operations that generated and assigned the respective sequence identifiers. In one embodiment, a sequence identifier is a 64-bit number assigned by a journaling storage system to a set of data blocks in volatile memory that are stored to a storage device using an atomic write operation. The journaling storage system is configured such that, each time a new set of data blocks are stored atomically to the storage device, the new set has the next successive sequence identifier in a sequence of numbers used for the sequence identifiers.

Examples of a sequence identifier include, but are not limited to, a timestamp, a transaction group number assigned to a transaction group of a Z File System (ZFS), a real time clock value, and the like.

In certain embodiments, a source node and a destination node are independent storage systems that each have their own storage pools and each have their own sequence identifiers. The sequence identifier of a source node and a destination node may or may not correctly represent a sequence of storage events on each node because the two systems are independent. In one embodiment, both the source node and the destination node use a ZFS file system, are independent storage systems, and each have their own storage pools and sequence identifiers, implemented using separate transaction group numbers.

"Consistency sequence identifier" refers to a sequence identifier associated with a consistency point. In one embodiment, a consistency sequence identifier is created when a consistency point is defined between a source node for a source volume and a destination node and the corresponding destination volume. In one embodiment, a consistency sequence identifier comprises a transaction group number assigned when an instantaneous snapshot is created on either a source node or a destination node for a respective volume.

"Timestamp" refers to any value indicative of a particular instance in time. Timestamps may include, for example, the value of a counter or sequence number that is updated periodically, a value including a date, hours, minutes, and/or seconds, etc.

In one embodiment, the source node 104 may create a snapshot of the state of the source volume 122 and the destination node 106 may create a snapshot of the state of the destination volume 134. Because the source volume 122 and destination volume 134 were in synchronization before the failure (T1), the snapshot taken by the source node 104 may match the snapshot taken by the destination node 106. These two matching snapshots together may define the consistency point 206.

It should be noted that, since the source node 104 may send replication data to the destination node 106 and the source volume 122 and destination volume 134 may be in synchronization before the failure at T1, the source node 104 and destination node 106 may not need to create the consistency point 206 at the exact same time, T2. As long as the consistency point 206 is created by the source node 104 after T1 and prior to servicing write commands from the host 102 at T3 and the destination node 106 does its part to create the consistency point 206 at some time between T1 and T4, embodiments of the claimed solution may reestablish a synchronous phase in a predictable manner.

Once communication between the source node 104 and destination node 106 is restored, and/or the failure is resolved, and the destination node 106 is available for data replication (T4), the source node 104 may pause storage commands, such as write commands, from the host (T5) and may create a second snapshot 212 (T6). At this point, the non-synchronous phase 208 may be completed, and the source node 104 and destination node 106 may enter the pre-synchronous phase 302, illustrated in FIG. 3.

Figure 3:
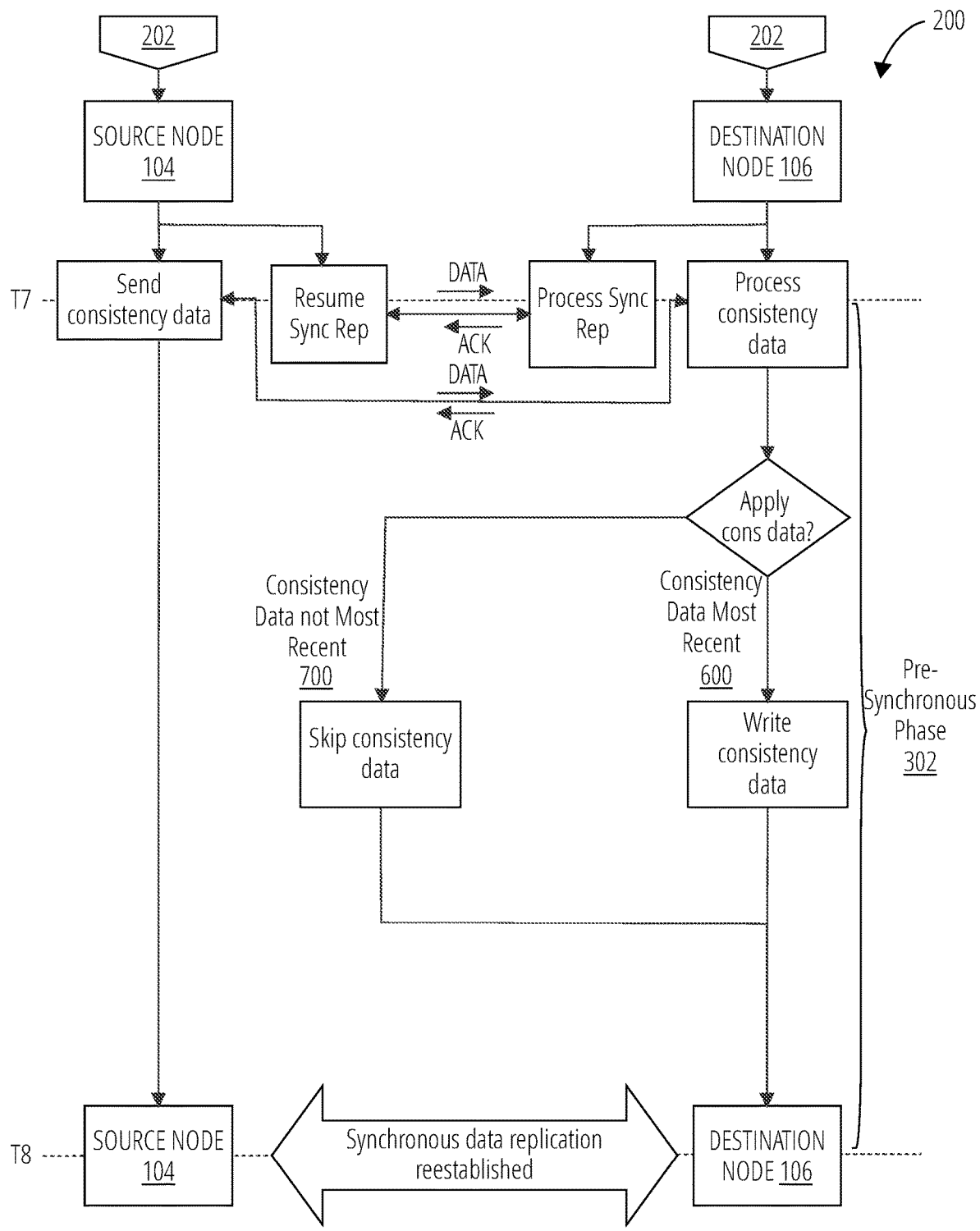
FIG. 3 illustrates a second portion of the process flow for recovering to a synchronous phase of synchronous data replication 200 in accordance with one embodiment.

FIG. 3 illustrates a continuation of the process flow for recovering to a synchronous phase of synchronous data replication 200 in accordance with one embodiment (see designators 202). At the beginning of the process flow (time T7), the source node 104 may perform two operations concurrently, or in parallel. Specifically, the source node 104 may resume the synchronous data replication ("Sync Rep")

(similar to synchronous data replication done at time T0) for write commands from the host 102, and the source node 104 may also begin sending consistency data to the destination node 106. Those of skill in the art will recognize that performing these two operations concurrently, or in parallel, means that each of the operations may be performed as close to simultaneously as the computing and communications resources of the source node 104, network 108, and destination node 106 permit. The synchronous data replication may be resumed to continue providing that storage feature, and the consistency data may be sent to recover to a synchronous phase after failure. As used herein, replication data represents the data sent during synchronous data replication.

The source node 104 may derive the consistency data using a variety of techniques. In one embodiment, the source node 104 may compare the first snapshot 210 and the second snapshot 212 to determine which data blocks have been changed (e.g., a delta, a differential, or the like). These changed data blocks may represent a set of inconsistent data blocks and may form the consistency data that the source node 104 begins sending to the destination node 106. "Set of inconsistent data blocks" refers to a set of one or more inconsistent data blocks.

The destination node 106 may process the consistency data to determine whether or not to write the consistency data to the destination volume 134, such as a hard disk. Because consistency data and replication data may be processed concurrently, or in parallel, and the volumes were in synchronization prior to the failure, the destination node 106 may not over write replication data that is modified or completely overwritten during the pre-synchronous phase (also referred to herein as a re-sync phase) with consistency data. The destination storage manager 124 may be configured to determine that the consistency write command satisfies the consistency point based on the consistency data of the consistency write command comprising a most current set of data for the data block.

If the data block of the destination volume has not received any changes during the pre-synchronous phase, then the consistency write command (which includes changes since the consistency point) may bring the destination volume closer to being fully consistent. This is what is meant by the consistency write command satisfying the consistency point.

The consistency write command may satisfy the consistency point for the destination volume and the source volume when the consistency write command implements a change that either makes the destination volume consistent with the source volume or brings the set of data of the destination volume close to being consistent with the source volume.

In one embodiment, the destination storage manager may be configured to process a replication write command by storing a modified version of the data block, along with its sequence identifier, on the destination volume, on condition that the sequence identifier is greater than a consistency sequence identifier representative of the consistency point. The destination storage manager may likewise be configured to omit writing consistency data to the data block on the destination volume when it has already processed a replication write command for that data block.

In one embodiment, the destination storage manager may evaluate the consistency data in relation to a snapshot taken of the destination volume 134. Specifically, the destination storage manager may compare a sequence identifier for a data block of the destination volume 134 with a consistency sequence identifier for the snapshot. In one embodiment, the sequence identifier and/or consistency sequence identifier may be one of a transaction group number and a timestamp.

In one embodiment, the destination storage manager may be configured to determine that a consistency write command satisfies the consistency point when the destination data block has received no data changes since the consistency point. This may be evidenced by the data block in question being absent in the destination node's volatile memory. When a read or write is performed on a data block, that data block may be stored in short-term or volatile memory as part of the process. The absence of the block in question within the destination node volatile memory may be taken as an indication that the data block remains unchanged in the destination volume.

In one embodiment the destination storage manager may be configured to determine that the consistency write command satisfies the consistency point based on the data block of the destination volume being found in memory but being flagged as receiving no data changes since the consistency point. This may serve as an indication that the data block has been accessed and thus stored in volatile memory, but has only been read, not written, and so is unchanged both in volatile memory and in the destination volume.

Figure 6:
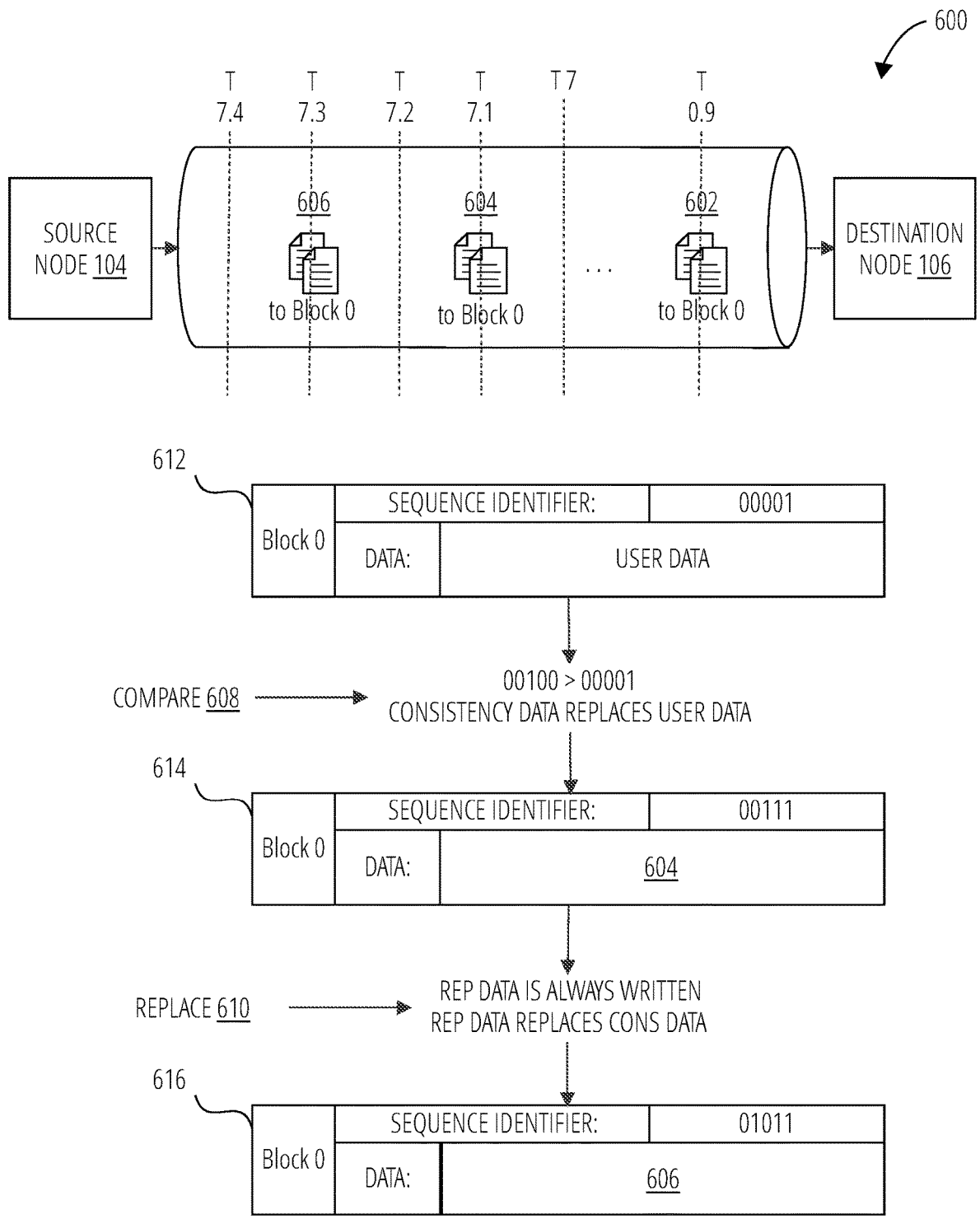
FIG. 6 illustrates a destination storage manager processing consistency data before a replication write command is processed for the same data block in accordance with one embodiment.
Figure 7:
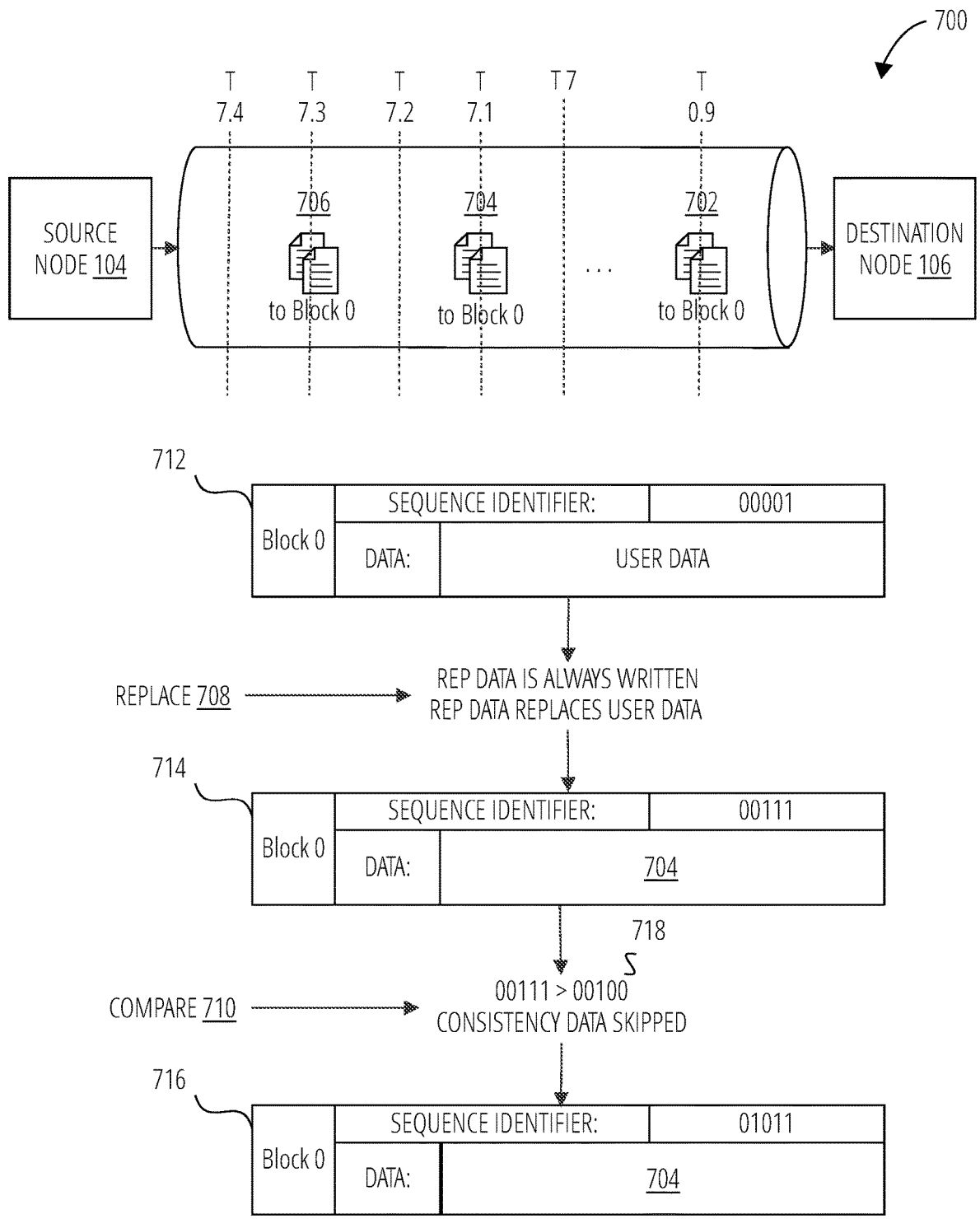
FIG. 7 illustrates a destination storage manager processing consistency data before a replication write command is processed for the same data block in accordance with one embodiment.
Figure 8:
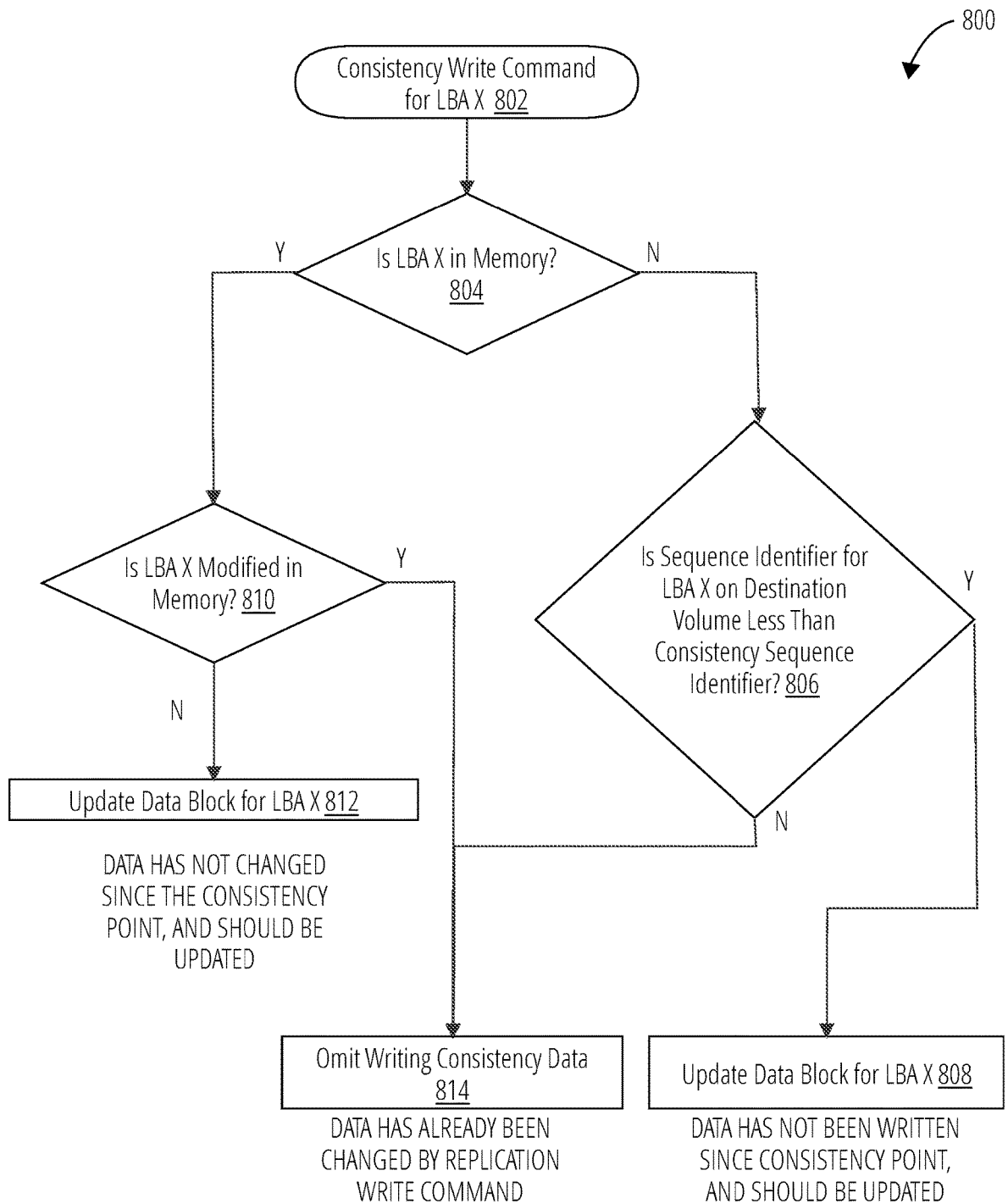
FIG. 8 illustrates a method for handling consistency data 800 in accordance with one embodiment.

Processes for determining whether or not to write consistency data received for a particular data block is illustrated in more detail in FIG. 6, FIG. 7, and FIG. 8.

At a predeterminable point in time, T8, all consistency data from the source node 104 may either be replicated to or discarded by the destination node 106. At this point, the source volume 122 and destination volume 134 may be in synchronization, and the source node 104 and destination node 106 may continue operation in the synchronous phase. "Predeterminable point in time" refers to a time that is defined and identified as a time in the future, before which, a storage system has the goal of having the source volume and destination volume operating in a synchronous phase.

Figure 4:
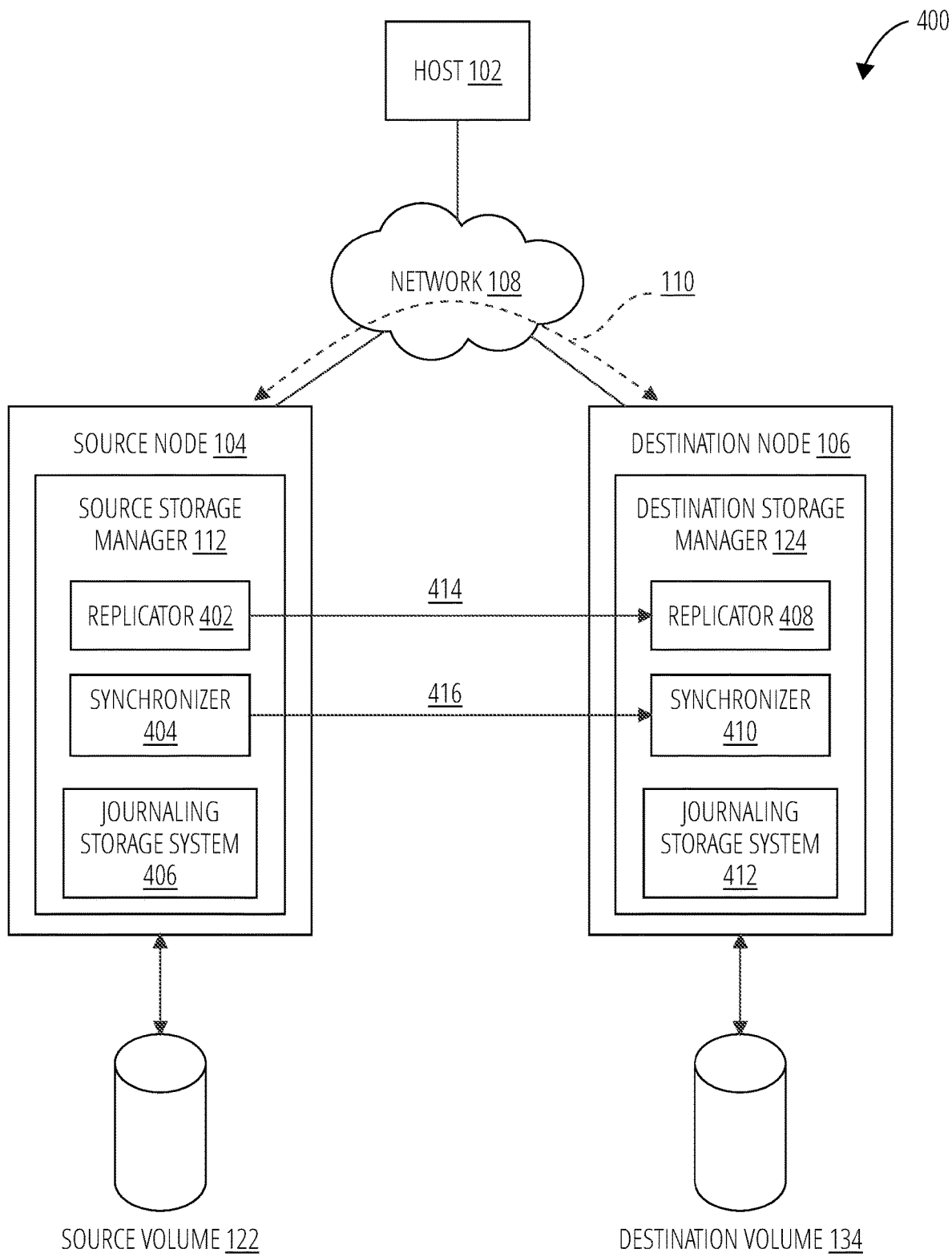
FIG. 4 illustrates a storage system 400 in accordance with one embodiment.

FIG. 4 illustrates a storage system 400 in accordance with one embodiment. This storage system 400 may be substantially the same as the storage system 100 of FIG. 1, with additional detail for the source storage manager 112 and destination storage manager 124. The source storage manager 112 may comprise a replicator 402, synchronizer 404, and journaling storage system 406. The destination storage manager 124 may also comprise its own replicator 408, synchronizer 410, and journaling storage system 412. The replicator 402 may send replication write commands 414 to the replicator 408 in order to replicate data from the host 102 to the destination volume 134. The synchronizer 404 may send consistency write commands 416 to the synchronizer 410 in accordance with this disclosure, to synchronize data during the pre-synchronous phase illustrated in FIG. 3.

The storage system 400 of FIG. 4, in accordance with one embodiment, may comprise a source storage manager 112. The source storage manager 112 may comprise a synchronizer 404 configured to send consistency write commands 416 to the destination storage manager 124 and a replicator 402 configured to send replication write commands 414 to the destination storage manager 124. The consistency write commands 416 and replication write commands 414 may be sent concurrently by the source storage manager 112. The source storage manager 112 may be configured to receive write commands from a host 102, to operate the replicator 402 and the synchronizer 404 concurrently (in parallel), and to send an acknowledgement for the write commands to the host 102. "Consistency write command" refers to a write command from a source node to a destination node. The consistency write command is configured to modify, change, or update inconsistent data blocks of a destination volume by writing consistency data such that the data block of the source node becomes consistent with (i.e., matches) the corresponding data block of the destination node.

When a consistency write command completes successfully, inconsistent data blocks of the destination volume become consistent with the corresponding (e.g., same LBA) data blocks on the source volume. A data block on a source volume is consistent with a corresponding data block on a destination volume when the data in both data blocks is exactly the same in relation to a particular point in time. "Consistency data" refers to data that represents differences in data values between a first data block and a second data block. Consistency data is configured, designed, or arranged, to make data values for both the first data block and second data block match. Consistency data, in one embodiment, comprises all the data of the first data block, including data values that presently match corresponding data values in the second data block. Consistency data, in another embodiment, comprises only a portion of the data of the first data block that presently does not match corresponding data values in the second data block. In one embodiment, a first data block is a data block from a source volume and a second data block is a data block from a destination volume.

Consistency data is configured such that once consistency data is applied to, copied to, or overwrites the data values of an inconsistent data block (e.g., the first data block or the second data block), the inconsistent data block becomes a consistent data block. A consistent data block is a data block having data values that match the data values of the corresponding data block at a particular point in time.

In one embodiment, consistency data is data generated by detecting a difference between a first consistency point, captured at the end of a synchronous phase of operation upon failure of a communication channel between a source node and a destination node, and a second consistency point, captured once communication is reestablished. Consistency data may be used to update destination volume data blocks with data written by the host while the communication channel was unavailable.

"Inconsistent data block" refers to a data block having data that no longer matches (is no longer exactly the same as) the data of another data block. Generally, an inconsistent data block is a data block that has changed, or been modified, when compared to another version of the same data block. The other versions used to determine whether a data block is an inconsistent data block may be the same data block at an earlier point in time, or a copy of the data block in another location, such as volatile memory and/or non-volatile memory or on a storage device. Consistency of data in two corresponding data blocks is determined based on the state of the data in the two data blocks at a particular point in time.

In one embodiment, a set of inconsistent data block is a set of all data blocks of a source volume in relation to data blocks of an empty volume, such as an empty destination volume. In this embodiment, the empty volume includes no data blocks, so the corresponding data blocks for the data blocks of the source volume do not yet exist. Since the data blocks corresponding to the data blocks of the source volume do not yet exist, all the data blocks of the source volume are considered inconsistent data blocks.

In one embodiment, an inconsistent data block is a data block of a destination volume having data that does not match the data of a corresponding data block (e.g., same LBA) of a source volume. Two corresponding data blocks may become inconsistent with each other due to a failure during a synchronous data replication operation or data migration operation because one data block may be modified while the other data block is not modified due to the failure. In one embodiment, inconsistent data blocks are modified to create consistent data blocks during a pre-synchronous phase to bring the storage system back into a synchronous phase of operation.

"Pre-synchronous phase" refers to a phase, stage, or state of operation during synchronous data replication in which one or more inconsistent data blocks of a first volume are becoming consistent with (e.g., being made to match) the data blocks of one or more other volume(s). In certain embodiments, the first volume is a source volume and the one or more other volume(s) are destination volumes.

"Empty volume" refers to a volume that is defined and configured but does not include any data blocks. In one embodiment, an empty volume may comprise data blocks, but the data blocks may not include user data, instead the original data blocks of an empty volume may include system, configuration, management, or control data. An empty volume may be configured to hold the same number of data blocks as, or more data blocks than, a source volume in one embodiment.

"Synchronizer" refers to any hardware, software, firmware, circuit, component, module, logic, device, or apparatus configured, programmed, designed, or engineered to copy one or more data blocks from a source location, such as a source volume or source node, to a destination location, such as a destination volume or destination node, such that data blocks on both the source volume and the destination volume become consistent (exactly the same).

In one embodiment, the synchronizer awaits an acknowledgement from a manager/controller of components of the destination location confirming that each data block has been successfully copied. In one embodiment, the synchronizer is configured to retry copying the one or more data blocks, if an earlier attempted copy operation is unsuccessful.

In one embodiment, all of the features, functions, and capabilities of the synchronizer are implemented at the source location. In another embodiment, certain features, functions, and/or capabilities of the synchronizer are implemented at the source location and certain other or complementary features, functions, and/or capabilities of the synchronizer are implemented by a corresponding synchronizer at the destination location.

"Replication write command" refers to a write command from a source node to a destination node for the purpose of replicating/copying data blocks transmitted from a host to the source node. The replication write command is configured to replace or modify all or a portion of a corresponding data block on the destination node. In certain embodiments, a source node awaits an acknowledgement from the destination node that the replication write command has succeeded before executing a write command from a host to ensure that the data in the data block of the source node matches the data of the data block of the destination node. In one embodiment, a replication write command is part of a synchronous data replication operation between the source node and the destination node.

"Replicator" refers to any hardware, software, firmware, circuit, component, module, logic, device, or apparatus configured, programmed, designed, or engineered to copy one or more data blocks referenced in a write command from a source location, such as a source volume or source node, to a destination location, such as a destination volume or destination node.

In one embodiment, the replicator awaits an acknowledgement from a manager/controller of components of the destination location confirming that each data block has been successfully copied. In one embodiment, the replicator is configured to retry copying the one or more data blocks if an earlier attempted copy operation is unsuccessful. In one embodiment, all of the features, functions, and capabilities of the replicator are implemented at the source location. In another embodiment, certain features, functions, and/or capabilities of the replicator are implemented at the source location and certain other or complementary features, functions, and/or capabilities of the replicator are implemented by a corresponding replicator at the destination location.

The source storage manager 112 and destination storage manager 124 of FIG. 4, in accordance with one embodiment, may each comprise a replicator configured to replicate a data block of a write command directed to a source volume 122 to a destination volume 134 by sending replication write commands 414. These replicators, replicator 402 and replicator 408, may be substantially the same as the replicator 900 illustrated in FIG. 9, with the difference being that each of replicator 402 and replicator 408 may be configured for its role as either the sender or the receiver of replication write commands 414.

The source storage manager 112 and destination storage manager 124 of FIG. 4, in accordance with one embodiment, may each comprise a synchronizer configured to synchronize inconsistent data blocks of the source volume 122 with corresponding data blocks of the destination volume 134 by sending consistency write commands 416. These synchronizers, synchronizer 404 and synchronizer 410, may be substantially the same as the synchronizer 500 illustrated in FIG. 5, with the difference being that each of synchronizer 404 and synchronizer 410 may be configured for its role as either the sender or the receiver of consistency write commands 416.

The source storage manager 112 and destination storage manager 124 of FIG. 4, in accordance with one embodiment, may comprise a journaling storage system. The source journaling storage system 406 and destination journaling storage system 412 may comprise logic that facilitates storage using a journaling file system. In certain embodiments, the journaling storage system 406 and journaling storage system 412 may each serve as both a file system and a logical volume manager. The journaling storage system 406 may manage the source volume 122 and the journaling storage system 412 may manage the destination volume 134.

"Journaling storage system" refers to a file system that tracks changes that are about to be made to structures of the file system and collects the changes in a log in the order in which the changes are to be made. The file system is configured to make the changes either individually, or in one or more batches of changes in such a way that all changes are permanently and successfully made or none of the changes are made if an error occurs. Certain journaling storage systems store the changes in a first-in-first-out log data structure and make the changes using atomic storage transactions. As used herein, a journaling storage system includes a journaling block device (JBD).

"Storage device" refers to any hardware, system, subsystem, circuit, component, module, non-volatile memory, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a solid-state storage device, Just a Bunch Of Disks (JBOD), Just a Bunch Of Flash (JBOF), an external hard disk, an internal hard disk, and the like.

In one embodiment, the source storage manager 112, the synchronizer 404, and the replicator 402 may operate within a source node 104, and the destination volume 134 may be operatively coupled to a destination node 106. The destination node 106 may comprise a destination storage manager 124 configured to write consistency data to the data block on the destination volume 134 in response to the destination storage manager 124 processing consistency write commands 416 before the destination storage manager 124 processes replication write commands 414 for the same data block. In one embodiment, the destination node 106 may comprise a destination storage manager 124 configured to omit writing consistency data to the data block on the destination volume 134 in response to the destination storage manager 124 processing replication write commands 414 before it processes consistency write commands 416 for the same data block.

The destination storage manager 124 may process the replication write commands 414 by loading the data block into memory and modifying the data block to match the data of the replication write commands 414. In another embodiment, the destination storage manager 124 may process the replication write commands 414 by storing a modified version of data block on a storage device, such as the destination volume 134, according to the replication write commands 414, and by storing a sequence identifier with the data block. The sequence identifier may be greater than a consistency sequence identifier representative of a consistency point for the destination volume 134 and the source volume 122, indicating that the replication write commands 414 were transmitted subsequent to reestablishing synchronous data replication.

The consistency write commands 416 may satisfy a consistency point for the destination volume 134 and the source volume 122. The destination storage manager 124 may be configured to determine that the consistency write commands 416 satisfy the consistency point based on the data block of the destination volume 134 having received no data changes since the consistency point.

The destination storage manager 124 may be configured to determine that the consistency write commands 416 satisfy the consistency point by determining that the data block of the destination volume 134 is unchanged in memory since the consistency point and that a sequence identifier assigned to the data block when stored on a storage device is less than a consistency sequence identifier representative of the consistency point. The destination storage manager 124 may be configured to update a data block on the destination volume in response to a consistency write commands 416 for the data block satisfying a consistency point for the destination volume 134 and the source volume 122.

The source storage manager 112 may be configured to operate the synchronizer 404 with a higher throughput than the replicator 402 in response to a quantity for the inconsistent data blocks satisfying a threshold. "Threshold" refers to a value representing a quantity against which a measurement and determination can be made. A threshold may include, but is not limited to, an upper bound, a lower bound, a number, a value, a quality, or the like.

The source storage manager 112 may be configured to operate the replicator 402 with a higher throughput than the synchronizer 404 in response to a storage system metric. "Storage system metric" refers to any attribute relating to a storage system that includes a source volume and a destination volume that can be identified or quantified. Examples of a storage system metric include, but are not limited to, a time of day, a recovery time objective (RTO), a host response time requirement, a quality of service metric, and the like. "Recovery time objective" refers to a time window during which a recovery operation, such as a recovery from an error or failure condition, is expected to be completed. A recovery time objective (RTO) may be set by a specification requirements sheet, a terms of service agreement, or the like.

The source storage manager 112 may be configured to send the consistency write commands 416 at a faster rate than the replication write commands 414 such that the source volume 122 and the destination volume 134 reach the synchronous phase at a predeterminable point in time.

The source storage manager 112 may be configured to determine a set of inconsistent data blocks between a consistency point for the destination volume 134 and the source volume 122, as well as a current point in time. The source storage manager 112 may further be configured to send the consistency write commands 416 at a faster rate than the replication write commands 414 in response to the number of data blocks in the set of inconsistent data blocks satisfying a threshold.

The source storage manager 112 may be configured to acknowledge completion of write commands to the host 102 in response to the replicator 402 failing to replicate a data block of the write command to the destination volume 134. In this manner, the host 102 may continue to send write commands to the source node 104 such that data is stored on the source volume 122, even when it cannot be replicated to the destination volume 134. This may allow the storage system 400 to continue storing host 102 data without interruption during a failure of synchronous data replication, or prior to establishing synchronous phase with a new (empty) destination volume 134.

A synchronizer may operate as a background process. Advantageously, in one embodiment, the source storage manager 112 may operate the synchronizer 404 and coordinate with the destination storage manager 124 to operate the synchronizer 410 at different throughput levels than the replicator 402 and/or replicator 408 operate. Those of skill in the art will recognize that throughput levels may be changed and adjusted using a variety of different techniques, including spawning more threads, processes, application, applets, or the like on either the source node 104 and/or the destination node 106 to get the desired throughput levels. In one embodiment, the source storage manager 112 may operate twice as many synchronizer 404 processes and the destination node 106 may operate twice as many synchronizer 410 processes in relation to the replicator 402 and replicator 408 processes operating.

Through this mechanism, the time required to apply all consistency data may be significantly reduced. These throughput levels may be adjusted based on a variety of storage parameter and/or storage system metrics. Because a synchronous phase may be reestablished concurrent to or in parallel with the servicing of write commands from the host, the return to the synchronous phase of synchronous data replication may be accomplished quickly, within a predictable time frame.

Figure 5:
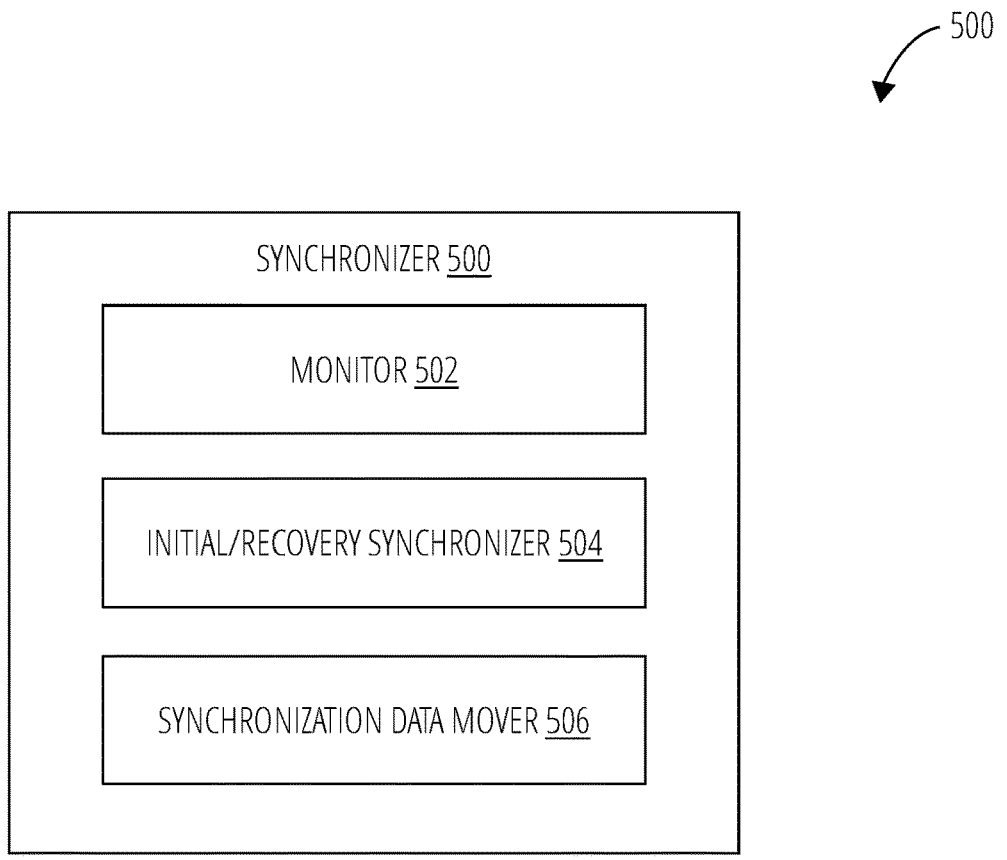
FIG. 5 illustrates a synchronizer 500 in accordance with one embodiment.

FIG. 5 illustrates one example of a synchronizer 500 suitable for use with different embodiments of storage system 100. The synchronizer 500 may serve as a replication write command handler in source node 104 or in destination node 106 during a synchronous data replication.

The synchronizer 500 comprises a monitor 502, an initial/recovery synchronizer 504, and a synchronization data mover 506 which may enable the synchronizer 500 to service replication write commands during a synchronous data replication.

The source storage manager 112 illustrated in FIG. 1 may manage the synchronizer 500, and may instruct the synchronizer 500 regarding how to handle commands during the synchronous data replication. In one embodiment, during synchronous data replication, the source storage manager 112 may direct the source node 104.

The monitor 502 may be configured to detect when the source volume and destination volume, together, are in one of a synchronous phase, a non-synchronous phase, and a pre-synchronous phase. "Monitor" refers to any hardware, software, firmware, circuit, component, module, logic, device, or apparatus configured, programmed, designed, arranged, or engineered to determine when a source volume and/or a destination volume are in one of a set of synchronous data replication phases, including a synchronous phase, a non-synchronous phase, and a pre-synchronous phase. In one embodiment, the monitor is configured to determine when a source volume and destination volume are in a transition state between one of the synchronous data replication phases.

In certain embodiments, a monitor is configured to monitor operational health of a communication channel between a source node and a destination node and/or operational health of the source node and/or destination node. In one embodiment, the monitor detects a failure or error condition for the synchronous data replication by detecting an error in one or more of the source node, the destination node, and the communication channel.

In one embodiment, all of the features, functions, and capabilities of the monitor are implemented at a source location. In another embodiment, certain features, functions, and/or capabilities of the monitor are implemented at a source location and certain other or complementary features, functions, and/or capabilities of the monitor are implemented by one or more corresponding monitors at one or more destination locations.

In alternate embodiments, part of the monitor functionality may be performed by a monitor 502 within the synchronizer 500 and part by a monitor 902 in a replicator 900. In some embodiments, the monitor may be incorporated as a separate unit in source storage manager 112 and may include only one monitor unit on the source side.

The initial/recovery synchronizer 504 may be configured to send the consistency write commands. The initial/recovery synchronizer 504 may check the set of inconsistent data blocks, retrieve the next block, formulate a command, and work with the synchronization data mover 506 to execute/transfer the command.

The synchronizer 500 may comprise a synchronization data mover 506. The replicator 900 may comprise a replication data mover 904. The source storage manager 112 may be configured to manage one or more synchronization data movers and one or more replication data movers. Throughput of consistency write commands and/or replication write commands may be managed by operating one or more synchronization data movers and replication data movers, respectively.

"Synchronization data mover" refers to any hardware, software, firmware, circuit, component, module, logic, device, or apparatus configured, programmed, designed, or engineered to copy or move one or more data blocks from a source location to a destination location. In particular, a synchronization data mover is a data mover configured to handle low level operations required to transfer a copy of one or more inconsistent data blocks from a source node to a destination node. In certain embodiments, the synchronization data mover is configured to replicate/copy inconsistent data blocks indicated in a consistency write command from the source node to the destination node.

"Replication data mover" refers to any hardware, software, firmware, circuit, component, module, logic, device, or apparatus configured, programmed, designed, or engineered to copy or move one or more data blocks from a source location to a destination location. In particular, a replication data mover is a data mover configured to handle low level operations required to transfer a copy of one or more data blocks from a source node to a destination node. In certain embodiments, the replication data mover is configured to replicate/copy data blocks indicated in a replication write command from the source node to the destination node.

The source storage manager may be configured to determine a set of inconsistent data blocks between a consistency point for the destination volume and the source volume and a current point in time. "Current point in time" refers to a present point in time. The source storage manager may further be configured to operate more synchronization data movers than replication data movers in response to the number of data blocks in the set of inconsistent data blocks satisfying a threshold. In a scenario in which the destination volume 134 is an empty volume, the inconsistent data blocks may comprise a set of data blocks comprising all of the data blocks of the source volume 122.

The source storage manager may be configured to operate more synchronization data movers than replication data movers in response to a storage parameter. "Storage parameter" refers to any parameter, value, setting, or configuration, that relates to the operation of a storage device or storage system. Storage parameters include, but are not limited to, a time of day, a workload level, a user defined parameter, a recovery time objective, a quantity for a set of inconsistent data blocks, and the like. The storage parameter may comprise a time of day, a workload level, a user defined parameter, a recovery time objective, a quantity for the set of inconsistent data blocks, or the like.

The source storage manager 112 may be configured to stop the synchronizer 500 in response to the monitor 502 detecting that the source volume and destination volume are in synchronous phase. The source storage manager 112 may be configured to stop the synchronizer 500 in response to the synchronizer having no more data blocks to process from a set of inconsistent data blocks.

FIG. 6 illustrates an example scenario in which consistency data for particular data block (Block 0) is processed before replication data for the same data block (Block 0). The processing scenario 600 illustrates a replication write command and a consistency write command arriving and being processed at the destination node 106.

Suppose data block 0 (replication data 602) is written to the destination volume 134 at some time prior to the failure event, T1, in the timeline of FIG. 2, for example, T0.9. When block 0 is written to the storage device storing the destination volume 134, the journaling storage system 412 may assign a sequence identifier of "00001" to block 0 and all other data blocks written together with block 0 to the storage device in the same atomic storage transaction. Block 0 612 illustrates what the contents of block 0 may be at T 0.9. Block 0 612 illustrates a logical block address, a set of user data, and a sequence identifier, "00001".

At time T7, synchronous data replication may resume and the source node 104 may begin sending consistency data in parallel with synchronous data replication. Suppose consistency data 604 arrives at the destination node 106 at time T7.1 and is queued to be processed before replication data 606, which arrives at time T7.3. At time T7.1, the synchronizer 410 may determine that the most recent copy of Block 0 612 resides on the storage device in the destination volume 134. The synchronizer 410 may load Block 0 612, or just the sequence identifier for Block 0 612, and compare 608 the sequence identifier of Block 0 612 to a consistency sequence identifier (e.g., a transaction group number for a snapshot taken at T2, to create the consistency point). Suppose the consistency sequence identifier for the snapshot taken at T2 to create the consistency point is "00100". The comparison may indicate that the consistency data 604 is more recent or more current than the data stored in Block 0 612 (because 00100 is greater than 00001).

Therefore, the synchronizer 410 may replace the data in Block 0 612 with the consistency data 604. This replacement may be done in memory 128, on the storage device, or both. Suppose Block 0 612 is written to the destination volume 134 and assigned a new sequence identifier, "00111". Block 0 614 illustrates the changed state of Block 0 614 on the destination volume 134. Note that the data section for Block 0 614 may now include the data of consistency data 604.

At time T 7.3, the destination storage manager 124 may process replication data 606 for Block 0. Specifically, the replicator 408 may process the replication data 606. Because the destination volume 134 was in synchronization prior to time T1, and no other replication data is received until after time T7, the replication data 606 may be the most recent version of block 0. Therefore, the replicator 408 may replace 610 consistency data 604 with replication data 606, either in memory 128 or on the storage device that stores the destination volume 134. Block 0 616 illustrates the changed state of Block 0 616 on the destination volume 134. Note that the data section for Block 0 616 may now include the data of replication data 606.

FIG. 7 illustrates an example scenario in which replication data for particular data block (Block 0) is processed before consistency data for the same data block (Block 0). The processing scenario 700 illustrates a replication write command and a consistency write command arriving and being processed at the destination node 106.

Suppose data block 0 (replication data 702) is written to the destination volume 134 at some time prior to the failure event, T1, in the timeline of FIG. 2, for example, T0.9. When block 0 is written to the storage device storing the destination volume 134, the journaling storage system 412 may assign a sequence identifier of "00001" to block 0 and all other data blocks written together with block 0 to the storage device in the same atomic storage transaction. Block 0 712 illustrates what the contents of block 0 are at T 0.9. Block 0 712 illustrates a logical block address, a set of user data and a sequence identifier, "00001".

At time T7, synchronous data replication resumes and the source node 104 begins sending consistency data in parallel with synchronous data replication. Suppose replication data 704 arrives at the destination node 106 at time T7.1 and is queued to be processed before consistency data 706 which arrives at time T7.3.

At time T7.1, the replicator 408 determines that because the destination volume 134 was in synchronization prior to time T1 and no other replication data is received until after time T7, the replication data 704 is the most recent version of block 0, therefore the replicator 408 will replace 708 user data with replication data 704, either in memory 128, or on the storage device that stores the destination volume 134, or both. Suppose Block 0 714 is written to the destination volume 134 and assigned a new sequence identifier, "00111". Block 0 714 illustrates the changed state of Block 0 714 on the destination volume 134. Note that the data section for Block 0 714 now includes the data of replication data 704.

At time T 7.3, the destination storage manager 124 processes consistency data 706 for Block 0. Specifically, the synchronizer 410 may process the consistency data 706. The synchronizer 410 may load Block 0 712 or just the sequence identifier for Block 0 712 and compare 710 the sequence identifier of Block 0 714 to a consistency sequence identifier 718 (e.g., a transaction group number for a snapshot taken at time T2, to create the consistency point). Suppose the consistency sequence identifier for the snapshot taken at time T2, to create the consistency point is "00100". The comparison indicates that the consistency data 706 is not more recent, not more current, than the data stored in Block 0 714 (because 00111 is greater than 00100). The data stored in Block 0 716 remains the same as the data stored in Block 0 714 because the consistency data 706 is omitted (e.g., not applied, not used).

FIG. 8 illustrates one method for handling consistency data 800 according to one embodiment. The steps of the method for handling consistency data 800 may be performed by the synchronizer 410 of a destination node, such as destination node 106, in accordance with one embodiment. In some embodiments, particularly those utilizing a journaling storage system, a sequence identifier may be sequentially incremented each time data blocks in volatile memory 130 are stored to the destination volume 134, which may reside in whole or in part in the non-volatile memory 132 and/or a hard disk drive or other storage device of the destination node 106.

In certain embodiments, the source node 104 and destination node 106 may be independent systems that each use sequence identifiers and consistency sequence identifiers to track when data blocks are moved from volatile memory to non-volatile memory such as a hard disk drive. Consequently, there may be no reliable way to ensure that the sequence identifiers and consistency sequence identifiers of the source node reflect the proper sequence of events for a synchronous data replication operation in relation to the sequence identifiers and consistency sequence identifiers of the destination node. Thus the sequence identifier assigned to a particular data block at the source node 104 may differ from the sequence identifier the replicated data block receives when the destination node 106 stores the data block to non-volatile memory 132, as the source node 104 and destination node 106 may each be incrementing a set of sequence identifiers according to their own needs and operating conditions.

In such an embodiment, a method for handling consistency data 800 may be used to determine whether or not to process consistency data at the destination node 106, such that the consistency data becomes stored in the destination volume 134. This determination may require review of certain other conditions, because the sequence identifier systems of the source node and destination node may be different, and because the consistency data may be sent concurrent with replication data that may have modified a data block referenced in the consistency data. To make this determination, the method for handling consistency data 800 may use the logical block address for each data block and may check other conditions of the corresponding data block on the destination node.

First, in one embodiment, the synchronizer 410 may receive 802 a consistency write command for a particular logical block address, such as LBA X. Next, the synchronizer 410 may determine 804 whether or not LBA X currently exists in (i.e., has been loaded into) memory 128.

If LBA X is in memory 128, the synchronizer 410 may determine 810 whether or not data of the data block for LBA X has been modified since first being loaded into memory 128, subsequent to the consistency point 206. If the data block for LBA X has not been modified since the consistency point 206, then the consistency data may include changes to the data block for LBA X subsequent to the consistency point 206, and the synchronizer 410 may update 812 the data block in memory 128 to reflect the consistency data. If the data block for LBA X has been modified since the consistency point 206, then replication data may have changed the data block, and the consistency data should not be applied (i.e., changed). Thus, the synchronizer 410 may omit 814 writing/updating the consistency data to the data block of LBA X in memory 128.

Alternately, the synchronizer 410 may determine 804 that the data block of LBA X is not in memory 128. Next, the synchronizer 410 may determine 806 how the sequence identifier for the data block stored in the destination volume 134 relates to the consistency sequence identifier for the consistency point 206. In a particular embodiment, the synchronizer 410 may determine 806 whether a transaction group number for the data block of LBA X is less than the transaction group number (e.g., consistency sequence identifier) of a snapshot taken of the destination volume 134.

If the transaction group number for the data block of LBA X is less than the transaction group number of a snapshot taken of the destination volume 134 to create the consistency point 206, then the data block of LBA X may have been written to the destination volume 134 before the snapshot and the consistency point 206 were created, because transaction group numbers, in one embodiment, may be numeric values that monotonically increase. Consequently, the data of the data block of LBA X may have been changed on the source volume 122, and these changes may be represented in the consistency data.

Thus, the synchronizer 410 may update 808 the data block for LBA X by writing the consistency data to the data block. In one embodiment, the synchronizer 410 may update 808 the data block in memory 128, and the data block may be written to the destination volume 134 in due course. In another embodiment, the synchronizer 410 may update 808 the data block by writing the data block for the storage device that includes the destination volume 134.

The synchronizer 410 may determine 806, based on the sequence identifier for the data block stored in the destination volume 134, that the data block has been changed since the consistency point 206. In this case, the synchronizer 410 may omit 814 writing the consistency data to the data block. The synchronizer 410 may not update the data block with the consistency data.

In a particular embodiment, the synchronizer 410 may determine 806 that the transaction group number for the data block of LBA X is not less than the transaction group number (e.g., consistency sequence identifier) of a snapshot taken of the destination volume 134. If the transaction group number for the data block of LBA X is greater than or equal to the transaction group number of a snapshot taken of the destination volume 134 to create the consistency point 206, then the data block of LBA X may have been written to the destination volume 134 after the snapshot and consistency point 206 were created. Consequently, the data of the data block of LBA X may have been changed on the destination volume 134, and the changes represented in the consistency data may invalid and may not be applied.

Figure 9:
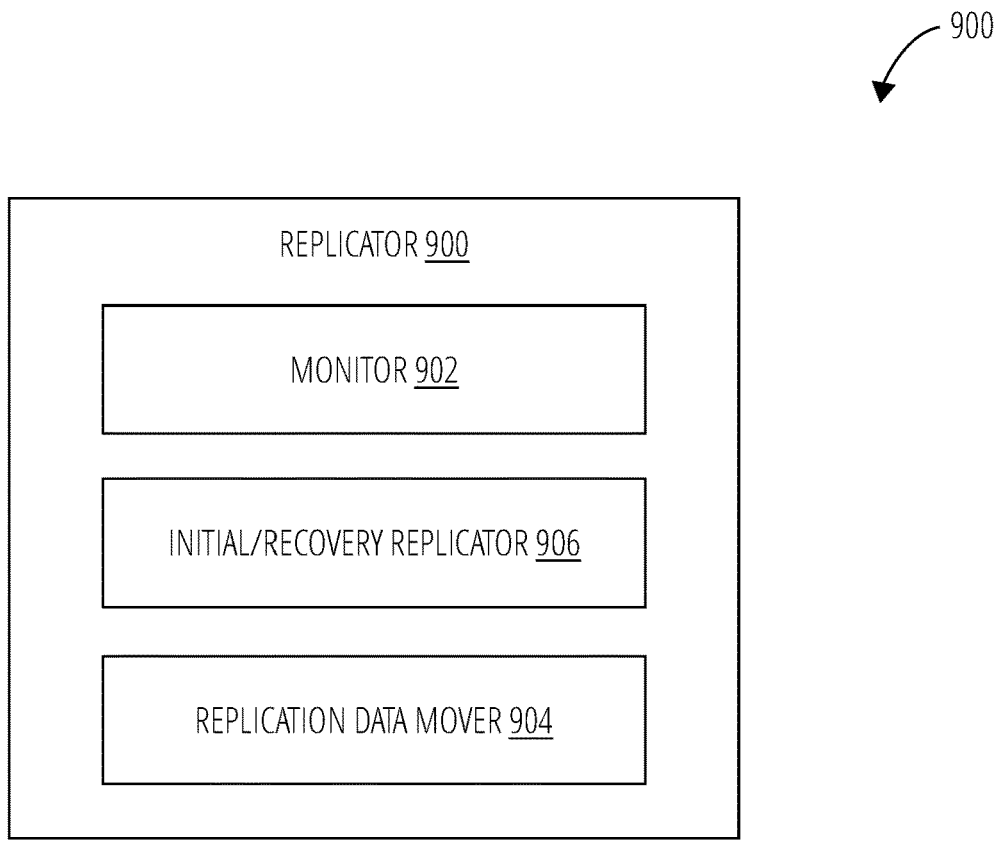
FIG. 9 illustrates a replicator 900 in accordance with one embodiment.

FIG. 9 illustrates one example of a replicator 900 suitable for use with different embodiments of storage system 100. The replicator 900 may serve as a replication write command handler in source node 104 or as a replication write command handler in destination node 106 during a synchronous data replication.

The replicator 900 comprises a monitor 902, an initial/recovery replicator 906, and a replication data mover 904 which may enable the replicator 900 to service replication write commands received from the host 102 during a synchronous data replication.

In certain embodiments, the replicator 900 may be configured to replicate a portion of the data block in response to the write command comprising data for only a portion of the data block and in response to the source volume and destination volume being in a synchronous phase. However, in contrast, during the process flow for recovering to a synchronous phase of synchronous data replication 200, the replicator 900, such as replicator 402, may be configured to send all of the data for a data block in the replication write command, even though the write command from the host 102 for this particular data block only changed part of the data of the data block. In this manner, this embodiment may ensure that the whole data block on the destination volume 134 is updated to the most recent set of data following a non-synchronous phase 208.

The destination storage manager 124 may be configured to store a sequence identifier with the data block to a storage device comprising the destination volume 134 in response to the replication write command being a free data block command and the source volume and destination volume being in a pre-synchronous phase. "Free data block command" refers to any command, instruction, directive or hint that communicates to the receiver that the data block(s) identified in the free data block command are no longer needed, being used, or valid for the host, user, client, application, or agent that originally initiated a storage command that created the data block. Examples of a free data block command include, but are not limited to, a TRIM command, an UNMAP command, a free LBA command, and the like.

In one embodiment, the destination storage manager 124 may store a sequence identifier with the data block to a storage device for the destination volume 134 in response to the replication write command being a free data block command, because this may create a record of the change in state made to the data block from a regular data block to a freed or unmapped data block. This change in state may be used by the synchronizer 410 in comparing the data block(s) identified in the free data block command and any inconsistent data blocks that are processed after processing this free data block command. By writing the sequence identifier, the synchronizer 410 may be able to run comparisons to determine that later-arriving consistency data for the data block may not be applied because the data block has been freed by the free data block command.

Figure 10:
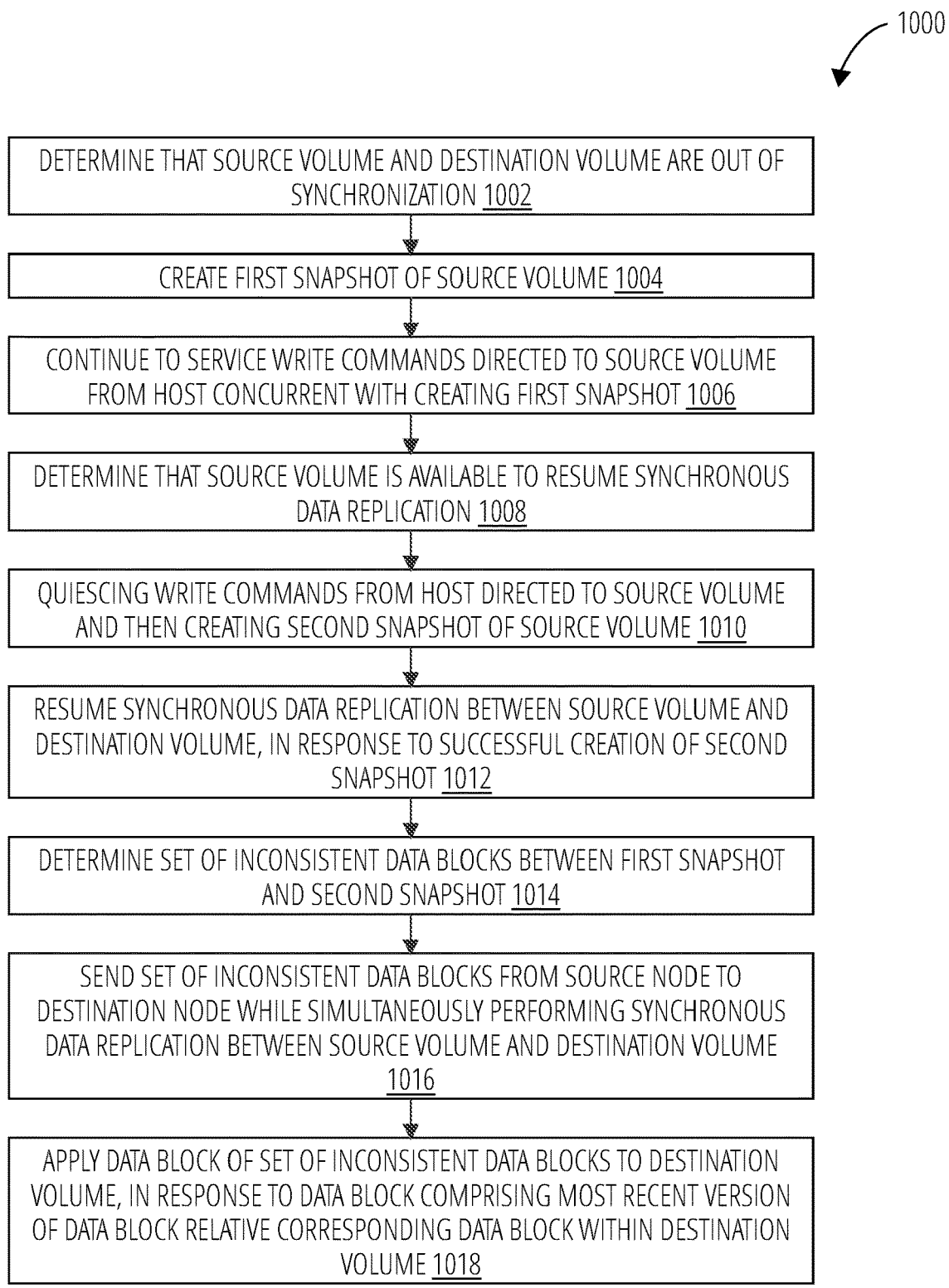
FIG. 10 illustrates a routine in accordance with one embodiment.

FIG. 10 illustrates a method for predictably reestablishing a synchronous phase after transitioning to a non-synchronous phase 1000 in accordance with one embodiment. First, in block 1002, it may be determined that a source volume and a destination volume are out of synchronization. This may occur as a result of a failure of the network connection between the source node and destination node. Alternately, this may occur at the beginning of synchronous data replication, when the host may begin writing to the source volume, and the destination volume may be determined to be an empty volume.

As a result of determining the source volume and destination volume are out of synchronization, a first snapshot may be created of the source volume in block 1004. This snapshot may be the first snapshot 210 as illustrated in FIG. 2. In some embodiments, a first snapshot may be taken of the destination volume in addition to the one taken of the source volume. This snapshot of the destination volume may not be taken at the exact same time as that taken of the source volume. It may be taken at any point in time up to the reestablishment of communication between the source and destination. In block 1006, the source storage manager may continue to service commands directed to the source volume from a host, concurrent with creating the first snapshot.

In block 1008, the source volume may be determined to be available to resume synchronous data replication. This may be once network connectivity is restored between a source node and a destination node. Alternately, this may be immediately after the snapshot is taken, in the case that synchronous data replication has just begun with an empty destination volume, and no failure has occurred in the network connectivity between the source node and destination node.

In block 1010, once the source volume is available to resume synchronous data replication, write commands from the host directed to the source volume may be quiesced. "Quiesce" refers to an act of "[pausing] or [altering] a device or application to achieve a consistent state, usually in preparation for a backup [operation] or other maintenance [operation]." ("quiesce." Wikipedia. Jul. 17, 2018. Accessed Jul. 22, 2019. https://en.wikipedia.org/wiki/quiesce.) A second snapshot of the source volume may then be created. This second snapshot may capture the state of the source volume, including host interactions since the first snapshot was captured.

Synchronous data replication between the source volume and the destination volume may be resumed in block 1012 in response to successful creation of the second snapshot. Replication data from the host may be written to both the source volume and the destination volume, just as before the connectivity failure, even though the source and destination are not yet operating in synchronous phase.

In block 1014, a set of inconsistent data blocks may be determined between the first snapshot and the second snapshot. The set of inconsistent data blocks may be sent in block 1016 from the source node to the destination node while simultaneously performing synchronous data replication between the source volume and the destination volume.

In block 1018, a data block of the set of inconsistent data blocks may be applied to the destination volume, in response to the data block comprising a most recent version of the data block relative to a corresponding data block within the destination volume. In one embodiment, the data block of the set of inconsistent data blocks may be applied by not changing the data block of the destination volume when a synchronous data replication write command has changed the data block before the set of inconsistent data blocks arrives at the destination volume.

In one embodiment, a system is provided for achieving synchronous data replication. The system, in one embodiment, includes a means for determining that a source volume and a destination volume are out of synchronization. The means for determining that a source volume and a destination volume are out of synchronization, in various embodiments, may include source node 104, source storage manager 112, destination node 106, destination storage manager 124, replicator 402, replicator 408, synchronizer 404, synchronizer 410, or the like. In one embodiment of the system, the means for determining that the source volume and the destination volume are out of synchronization comprises determining that the destination volume comprises an empty volume.

In certain embodiments, the system may include a means for creating a first snapshot of the source volume. The means for creating a first snapshot of the source volume, in various embodiments, may include source node 104, source storage manager 112, replicator 402, synchronizer 404, or the like.

The system, in one embodiment, includes a means for continuing to service write commands directed to the source volume from a host concurrent with creating the first snapshot. The means for continuing to service write commands, in various embodiments, may include source node 104, source storage manager 112, replicator 402, synchronizer 404, or the like.

In certain embodiments, the system may include a means for determining that the destination volume is available to resume synchronous data replication. The means for determining that the destination volume is available to resume synchronous data replication, in various embodiments, may include source node 104, source storage manager 112, replicator 402, synchronizer 404, or the like.

The system, in one embodiment, includes a means for quiescing the write commands from the host directed to the source volume. The means for quiescing the write commands, in various embodiments, may include source node 104, source storage manager 112, replicator 402, synchronizer 404, or the like.

In certain embodiments, the system may include a means for creating a second snapshot of the source volume. The means for creating a second snapshot of the source volume, in various embodiments, may include source node 104, source storage manager 112, replicator 402, synchronizer 404, or the like.

In certain embodiments, the system may include a means for resuming the synchronous data replication between the source volume and the destination volume, in response to successful creation of the second snapshot. The means for resuming the synchronous data replication between the source volume and the destination volume, in response to successful creation of the second snapshot, in various embodiments, may include source node 104, source storage manager 112, destination node 106, destination storage manager 124, replicator 402, replicator 408, synchronizer 404, synchronizer 410, or the like.

The system, in one embodiment, includes a means for determining a set of inconsistent data blocks between the first snapshot and the second snapshot. The means for determining a set of inconsistent data blocks between the first snapshot and the second snapshot, in various embodiments, may include source node 104, source storage manager 112, replicator 402, synchronizer 404, or the like.

In certain embodiments, the system may include a means for sending the set of inconsistent data blocks from a source node to a destination node while simultaneously performing the synchronous data replication between the source volume and the destination volume. The means for sending the set of inconsistent data blocks from a source node to a destination node while simultaneously performing the synchronous data replication between the source volume and the destination volume, in various embodiments, may include source node 104, source storage manager 112, destination node 106, destination storage manager 124, replicator 402, replicator 408, synchronizer 404, synchronizer 410, or the like.

In certain embodiments, the system may include a means for applying a data block of the set of inconsistent data blocks to the destination volume, in response to the data block comprising a most recent version of the data block relative to a corresponding data block within the destination volume. The means for applying a data block of the set of inconsistent data blocks to the destination volume, in response to the data block comprising a most recent version of the data block relative to a corresponding data block within the destination volume, in various embodiments, may include destination node 106, destination storage manager 124, replicator 408, synchronizer 410, or the like. In one embodiment of the system, the means for applying the data block of the set of inconsistent data blocks to the destination volume comprises not changing the data block of the destination volume corresponding to the data block, in response to the write command of the synchronous data replication changing the data block of the destination volume prior to applying the data block of the set of inconsistent data blocks to the destination volume.

Advantageously, the disclosed solution includes both the transmission of the set of inconsistent data blocks concurrently or in parallel with restored synchronous data replication, and the mechanism by which inconsistent data blocks are omitted if the data block has been updated with replication data subsequent to connectivity being restored. Because the rectification of inconsistency is concurrent with, yet cedes priority to, the real-time replication of host data, the storage system may return to a fully synchronous phase of synchronous data replication by a predeterminable point in time. This time may be shortened by providing multiple channels for replication data and consistency data, or by otherwise speeding the transmission of one data set or the other, but the time to recovery may be predictable in all cases.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A system comprising:
a processor;
system memory coupled to the processor and storing instructions configured to cause the processor to:
determine that a source volume and a destination volume are out of synchronization;
concurrently:
create a first snapshot of the source volume; and
continue to service write commands directed to the source volume from a host;
determine that the destination volume is available to resume synchronous data replication;
in response to determining that the destination volume is available to resume synchronous data replication:
quiesce write commands from the host directed to the source volume; and
create a second snapshot of the source volume;
resume the synchronous data replication between the source volume and the destination volume, subsequent to successful creation of the second snapshot;
identify a set of one or more inconsistent data blocks between the first snapshot and the second snapshot;
essentially simultaneously:
send the set of one or more inconsistent data blocks from a source node to a destination node; and
perform the synchronous data replication between the source volume and the destination volume;
access a data block from among the one or more inconsistent data blocks;
determine that the accessed data block is a most recent version of the data block relative to a corresponding data block at the destination volume; and
apply the accessed data block to the destination volume.

2. The system of claim 1, further comprising instructions configured to:
receive a write command prior to applying the accessed data block to the destination volume;
pause implementation of the write command temporarily; and
change another data block at the destination volume in accordance with the write command subsequent to applying the accessed data block to the destination volume.

3. The system of claim 1, wherein instructions configured to determine that the source volume and the destination volume are out of synchronization comprises instructions configured to determine that the destination volume comprises an empty volume.

4. The system of claim 1, wherein instructions configured to determine that a source volume and a destination volume are out of synchronization comprise instructions configured to detect a loss of communication between the source node and the destination node.

5. The system of claim 1, wherein instructions configured to identify a set of one or more inconsistent data blocks between the first snapshot and the second snapshot comprise instructions configured to detect differences in data values between at least one block in the first snapshot and at least one corresponding block in the second snapshot.

6. The system of claim 5, wherein instructions configured to detect differences in data values between at least one block in the first snapshot and at least one corresponding block in the second snapshot comprise instructions configured to detect differences between a block associated a logical block address (LBA) in the first snapshot and another block associated with the logical block address (LBA) in the second snapshot.

7. The system of claim 1, wherein instructions configured to send the set of one or more inconsistent data blocks comprise instructions configured to send the set of one or more inconsistent data blocks at a faster rate relative to replication data based on the number of inconsistent data blocks.

8. The system of claim 1, wherein instructions configured to continue to service write commands directed to the source volume from a host comprise instructions configured to:
receive a write command from the host;
store data on the source volume in accordance with the write command while the source volume and a destination volume are out of synchronization; and
send an acknowledgement of the write command to the host.

9. The system of claim 1, wherein instructions configured to determine that the accessed data block is a most recent version of the data block relative to a corresponding data block at the destination volume comprise instructions configured to compare a sequence identifier of the accessed data block to another sequence identifier of the corresponding data block.

10. A method comprising:
   determining that a source volume and a destination volume are out of synchronization;
   concurrently in response to the determining that a source volume and a destination volume are out of synchronization:
      creating a first snapshot of the source volume; and
      continuing to service write commands directed to the source volume from a host;
   determining that the destination volume is available to resume synchronous data replication subsequent to creating the first snapshot;
   in response to determining that the destination volume is available to resume synchronous data replication:
      quiescing write commands from the host directed to the source volume; and
      creating a second snapshot of the source volume;
   resuming the synchronous data replication between the source volume and the destination volume, subsequent to successful creation of the second snapshot;
   identifying a set of one or more inconsistent data blocks between the first snapshot and the second snapshot;
   essentially simultaneously:
      sending the set of one or more inconsistent data blocks from a source node to a destination node; and
      performing the synchronous data replication between the source volume and the destination volume;
   accessing a data block from among the one or more inconsistent data blocks;
   determining that the accessed data block is a most recent version of the data block relative to a corresponding data block at the destination volume; and
   applying the accessed data block to the destination volume.

11. The method of claim 10, further comprising:
   receiving a write command prior to applying the accessed data block to the destination volume;
   pausing implementation of the write command temporarily; and
   changing another data block at the destination volume in accordance with the write command subsequent to applying the accessed data block to the destination volume.

12. The method of claim 10, wherein determining that the source volume and the destination volume are out of synchronization comprises determining that the destination volume comprises an empty volume.

13. The method of claim 10, wherein determining that a source volume and a destination volume are out of synchronization comprises detecting a loss of communication between the source node and the destination node.

14. The method of claim 10, wherein identifying a set of one or more inconsistent data blocks between the first snapshot and the second snapshot comprises detecting differences in data values between at least one block in the first snapshot and at least one corresponding block in the second snapshot.

15. The method of claim 14, wherein detecting differences in data values between at least one block in the first snapshot and at least one corresponding block in the second snapshot comprises detecting differences between a block associated a logical block address (LBA) in the first snapshot and another block associated with the logical block address (LBA) in the second snapshot.

16. The method of claim 10, wherein sending the set of one or more inconsistent data blocks comprises sending the set of one or more inconsistent data blocks at a faster rate relative to replication data based on the number of inconsistent data blocks.

17. The method of claim 10, wherein continuing to service write commands directed to the source volume from a host comprises:
   receiving a write command from the host;
   storing data on the source volume in accordance with the write command while the source volume and a destination volume are out of synchronization; and
   sending an acknowledgement of the write command to the host.

18. The method of claim 10, wherein determining that the accessed data block is a most recent version of the data block relative to a corresponding data block at the destination volume comprises comparing a sequence identifier of the accessed data block to another sequence identifier of the corresponding data block.

* * * * *